US012616951B2

(12) United States Patent
Lenser et al.

(10) Patent No.: US 12,616,951 B2
(45) Date of Patent: May 5, 2026

(54) COOLING METHODS FOR ULTRASONIC FORMING AND BONDING OF POLYMERIC WEBS

(71) Applicant: The Procter & Gamble Company, Cincinnati, OH (US)

(72) Inventors: Todd Douglas Lenser, Liberty Township, OH (US); Randall Allen Myers, Fairfield, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 429 days.

(21) Appl. No.: 18/301,294

(22) Filed: Apr. 17, 2023

(65) Prior Publication Data

US 2023/0330621 A1      Oct. 19, 2023

Related U.S. Application Data

(60) Provisional application No. 63/331,931, filed on Apr. 18, 2022.

(51) Int. Cl.
| | |
|---|---|
| *B01J 20/02* | (2006.01) |
| *B01J 20/34* | (2006.01) |
| *C09K 5/06* | (2006.01) |

(52) U.S. Cl.
CPC ....... *B01J 20/0248* (2013.01); *B01J 20/0211* (2013.01); *B01J 20/3483* (2013.01); *C09K 5/066* (2013.01)

(58) Field of Classification Search
CPC .................................................. B29C 65/086
See application file for complete search history.

(56) References Cited

U.S. PATENT DOCUMENTS

| | | | | |
|---|---|---|---|---|
| 5,397,407 | A | * | 3/1995 | D'Addario ........ B29C 66/43123 228/110.1 |
| 5,545,275 | A | | 8/1996 | Herrin et al. |
| 6,691,909 | B2 | * | 2/2004 | Skogsmo ............. B23K 20/106 228/111.5 |
| 8,745,827 | B2 | | 6/2014 | Rocha |
| 8,784,722 | B2 | * | 7/2014 | Rocha ................ A44B 18/0049 264/444 |
| 9,265,673 | B2 | | 2/2016 | Stabelfeldt et al. |

(Continued)

FOREIGN PATENT DOCUMENTS

| | | |
|---|---|---|
| DE | 10250741 A1 | 5/2004 |
| FR | 3053909 A3 | 1/2018 |
| WO | 2018006946 A1 | 1/2018 |

OTHER PUBLICATIONS

All Office Actions; U.S. Appl. No. 18/301,300, filed Apr. 17, 2023.

(Continued)

*Primary Examiner* — Xiao S Zhao
*Assistant Examiner* — Nicholas J Chidiac
(74) *Attorney, Agent, or Firm* — Gregory P. Habiak; Christian M. Best

(57) ABSTRACT

Methods and apparatuses for manufacturing portions of absorbent articles may include or facilitate conveying a substrate through a nip formed between a first device and a second device, transmitting vibrational energy from the second device toward the first device via the nip to alter the substrate, and cooling the second device by transferring thermal energy from the second device.

14 Claims, 15 Drawing Sheets

(56)                    References Cited

U.S. PATENT DOCUMENTS

| | | | |
|---|---|---|---|
| 9,265,674 B2 | 2/2016 | Hancock-cooke et al. | |
| 9,282,790 B2 | 3/2016 | Rocha et al. | |
| 9,795,194 B2 | 10/2017 | Rocha | |
| 10,076,162 B2 | 9/2018 | Rocha | |
| 10,159,313 B2 | 12/2018 | Rocha et al. | |
| 10,405,614 B2 | 9/2019 | Rocha | |
| 10,798,997 B2 | 10/2020 | Rocha | |
| 10,953,592 B2 | 3/2021 | Rocha | |
| 10,981,321 B2 | 4/2021 | Rocha | |
| 11,058,186 B2 | 7/2021 | Rocha | |
| 11,292,209 B2 | 4/2022 | Solenthaler | |
| 11,938,557 B2* | 3/2024 | Zrodowski | B23K 20/26 |
| 2003/0066863 A1* | 4/2003 | Skogsmo | B23K 20/106 |
| | | | 228/111.5 |
| 2010/0180407 A1* | 7/2010 | Rocha | B29C 59/04 |
| | | | 264/444 |
| 2019/0224054 A1 | 7/2019 | Silfverstrand et al. | |
| 2019/0387846 A1 | 12/2019 | Rocha | |
| 2020/0086586 A1 | 3/2020 | Solenthaler | |
| 2020/0179184 A1 | 6/2020 | Kaiser | |
| 2022/0106714 A1* | 4/2022 | Schneider | A61F 13/5633 |
| 2022/0161353 A1* | 5/2022 | Zrodowski | B23K 37/003 |
| 2023/0135888 A1* | 5/2023 | Hori | B23K 20/1245 |
| | | | 228/103 |

OTHER PUBLICATIONS

U.S. Unpublished U.S. Appl. No. 18/301,300, filed Apr. 17, 2023, to Todd Douglas Lenser et. al.

Extended EP Search Report and Search Opinion for 23168289.9 dated Jul. 10, 2023, 7 pages.

U.S. Unpublished U.S. Appl. No. 18/329,630, filed Jun. 6, 2023, Todd Douglas Lenser et al.

U.S. Unpublished U.S. Appl. No. 18/451,145, filed Aug. 17, 2023 to Todd Douglas Lenser et al.

* cited by examiner

600

604

602

102

104

106

101

107

109

109

111

COOLING METHODS FOR ULTRASONIC FORMING AND BONDING OF POLYMERIC WEBS

CROSS REFERENCE TO RELATED APPLICATION

This application claims the benefit of U.S. Provisional Application No. 63/331,931, filed Apr. 18, 2022, the entire disclosure of which is incorporated herein by reference.

FIELD

The present disclosure relates generally to forming and bonding substrates via vibrational energy and more specifically relates to cooling methods and apparatuses for ultrasonic forming and bonding of substrates.

BACKGROUND

The discussion of shortcomings and needs existing in the field prior to the present disclosure is in no way an admission that such shortcomings and needs were recognized by those skilled in the art prior to the present disclosure.

Sources of vibration energy in combination with an anvil may be used to create bonds in substrates conveyed therebetween and/or to create surface features in substrates conveyed therebetween. Surface features may include projections or hooks, as may be useful in hook and loop fasteners.

More specifically, sources of vibration energy in combination with an anvil may be used to create bonds in substrates conveyed therebetween. Examples of substrates bonded together by sources of vibration energy in combination with an anvil may include but are not limited to nonwoven materials and films of various types, which will be discussed in greater detail hereinafter. Bonds may be formed between nonwoven-nonwoven, film-nonwoven, or film-film. The sources of vibration energy may use ultrasonic energy. The source of vibration energy may press against the substrates to melt, to soften, and/or to deform a portion of the substrates where a bond is desired. The anvil may have a bonding nub around which the substrates are melted. The bonded substrates may have many uses, including but not limited to components of absorbent articles.

Additionally or alternatively, sources of vibration energy in combination with an anvil with a plurality of projection recesses formed therein may be used to create projections or hooks in substrates conveyed therebetween. Examples of substrates include but are not limited to films and/or nonwoven materials. These sources of vibration energy may use ultrasonic energy. To form the projections or hooks, the substrate(s) may be conveyed through a nip between a source of vibration energy and an anvil with a plurality of projection recesses defined therein. The source of vibration energy presses against the substrate to melt, to soften, and/or to deform a portion of the substrate into a deformable film that may flow, stretch, and/or otherwise deform into the plurality of projection recesses. The substrate(s) may then be moved out of the nip and the substrate may be removed from the anvil, resulting in a substrate having a plurality of projections or hooks in some regions, melted substrate around the projections or hooks, and/or normal nonwoven or film in other regions (non-melted regions). The plurality of projections may form one side of a touch fastener for an absorbent article.

Without being bound by theory, vibration energy may create a polymer flow or deformation into the projection recesses and/or against the nubs by heating a nonwoven and/or film via hysteresis losses from repeated compression and expansion of the polymer material in response to the vibration energy. A sonotrode, or ultrasound horn, may press against the polymer material with sinusoidal motion of the working surface of several tens of microns amplitude and a frequency of typically 20-40 kHz. Due primarily to high shear rates from high frequency compression, and aided by elevated temperature, the polymers exhibit shear thinning and flow more easily due to a lower apparent viscosity. The process is inherently inefficient, which may be due to impedance mismatches between the titanium or aluminum sonotrode and the low modulus polymer. Some sources suggest that only about 12% of the applied energy goes into melting the polymer. Due to the high cycle rate, sonotrodes for continuous duty nonwoven or film applications are typically titanium, which has excellent fatigue resistance, but poor thermal diffusivity.

Unsatisfactory results, including rips, tears, and holes in bonded or formed substrates have limited the applicability of ultrasonic bonding and forming processes at the high throughputs and line speeds required in the absorbent article industry, and other industries. A need, therefore, exists for methods and devices useful for ultrasonic forming and bonding of substrates in the absorbent article industry, and other industries.

SUMMARY

Various embodiments solve the above-mentioned problems and provide methods and devices useful for ultrasonic forming and bonding of substrates in the absorbent article industry. More specifically, various embodiments relate to a method of manufacturing portions of absorbent articles. The method may comprise conveying a substrate through a nip formed between a first device and a second device, transmitting vibrational energy from the second device toward the first device via the nip to alter the substrate, and cooling the second device by transferring thermal energy from the second device to a heat sink that is substantially isolated from the vibrational energy. The method may additionally or alternatively comprise providing a buffer material intermediate the heat sink and the second device and cooling the second device by transferring thermal energy from the second device through the buffer material to the heat sink.

Various embodiments relate to an apparatus for altering a substrate for an absorbent article. The apparatus may comprise a first device; a second device configured to transmit vibrational energy toward a nip formed between the second device and the first device, and a heat sink thermally coupled to the second device and configured to cool the second device while a substrate is conveyed through the nip to be altered by the vibrational energy. The apparatus may additionally or alternately comprise a buffer material positioned intermediate the heat sink and the second device. In which case, the heat sink may be configured to cool the second device by transferring thermal energy from the second device through the buffer material to the heat sink while a substrate is conveyed through the nip to be altered by the vibrational energy.

These and other features, aspects, and advantages of various embodiments will become better understood with reference to the following description, figures, and claims.

BRIEF DESCRIPTION OF THE DRAWINGS

Many aspects of this disclosure can be better understood with reference to the following figures.

Figure 1:
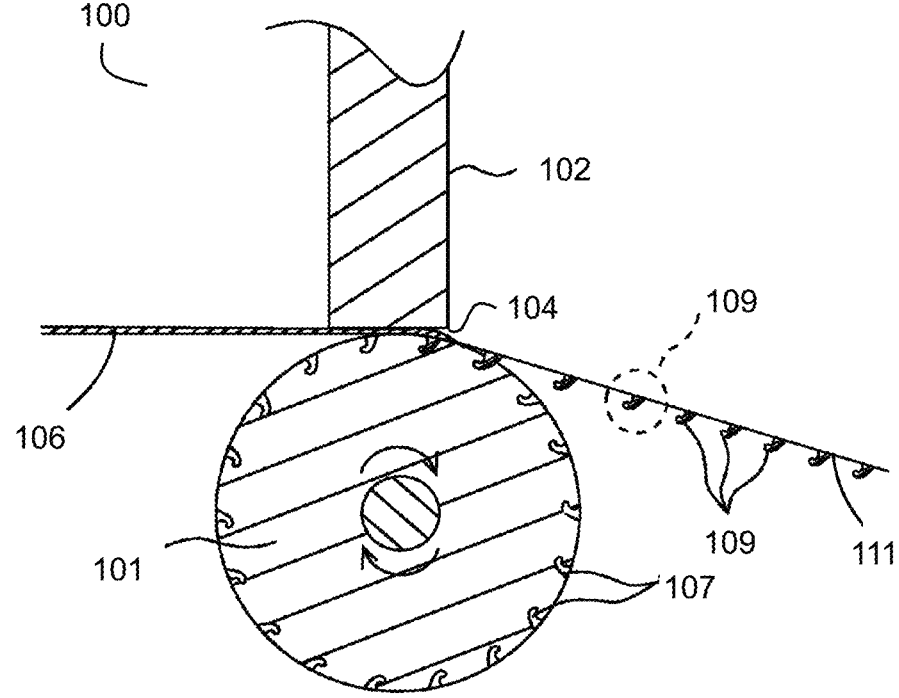
FIG. 1 is a schematic cross-sectional side view illustrating an example of an ultrasonic forming apparatus, which may benefit from the cooling methods according to various embodiments.

It should be understood that the various embodiments are not limited to the examples illustrated in the figures.

DETAILED DESCRIPTION

Introduction and Definitions

This disclosure is written to describe the invention to a person having ordinary skill in the art, who will understand that this disclosure is not limited to the specific examples or embodiments described. The examples and embodiments are single instances of the invention which will make a much larger scope apparent to the person having ordinary skill in the art. Unless defined otherwise, all technical and scientific terms used herein have the same meaning as commonly understood by the person having ordinary skill in the art. It is also to be understood that the terminology used herein is for the purpose of describing examples and embodiments only, and is not intended to be limiting, since the scope of the present disclosure will be limited only by the appended claims.

All the features disclosed in this specification (including any accompanying claims, abstract, and drawings) may be replaced by alternative features serving the same, equivalent, or similar purpose, unless expressly stated otherwise. Thus, unless expressly stated otherwise, each feature disclosed is one example only of a generic series of equivalent or similar features. The examples and embodiments described herein are for illustrative purposes only and that various modifications or changes in light thereof will be suggested to the person having ordinary skill in the art and are to be included within the spirit and purview of this application. Many variations and modifications may be made to the embodiments of the disclosure without departing substantially from the spirit and principles of the disclosure. All such modifications and variations are intended to be included herein within the scope of this disclosure. For example, unless otherwise indicated, the present disclosure is not limited to particular materials, reagents, reaction materials, manufacturing processes, or the like, as such can vary. It is also to be understood that the terminology used herein is for purposes of describing particular embodiments only and is not intended to be limiting. It is also possible in the present disclosure that steps can be executed in different sequence where this is logically possible.

In everyday usage, indefinite articles (like "a" or "an") precede countable nouns and noncountable nouns almost never take indefinite articles. It must be noted, therefore, that, as used in this specification and in the claims that follow, the singular forms "a," "an," and "the" include plural referents unless the context clearly dictates otherwise. Thus, for example, reference to "a support" includes a plurality of supports. Particularly when a single countable noun is listed as an element in a claim, this specification will generally use a phrase such as "a single." For example, "a single support."

In this specification and in the claims that follow, reference will be made to a number of terms that shall be defined to have the following meanings unless a contrary intention is apparent.

"Standard temperature and pressure" is used herein to generally refer to 25° C. and 1 atmosphere. Standard temperature and pressure may also be referred to as "ambient conditions." Unless indicated otherwise, parts are by weight, temperature is in ° C., and pressure is at or near atmospheric. The terms "elevated temperatures" or "high temperatures" generally refer to temperatures of at least 100° C.

"Disposed on" is used herein to refer to a positional state indicating that one object or material is arranged in a position adjacent to the position of another object or material. The term does not require or exclude the presence of intervening objects, materials, or layers.

"Anvil roll" is used herein to refer to any industrial tool comprising an essentially cylindrical form having a pattern or profile on the outer circumferential surface. An anvil roll is on example of a "first device" according to various embodiments. The first device need not be but may be essentially cylindrical. A first device may be any desirable shape, including but not limited to concave, convex, or flat according to various embodiments.

"Absorbent article" is used herein to refer to consumer products whose primary function is to absorb and retain soils and wastes. "Diaper" is used herein to refer to an absorbent article generally worn by infants, children, and incontinent persons about the lower torso. "Diaper" may include taped diapers and pant-type diapers. The term "disposable" is used herein to describe absorbent articles which generally are not intended to be laundered or otherwise restored or reused as an absorbent article (e.g., they are intended to be discarded after a single use and may also be configured to be recycled, composted, or otherwise disposed of in an environmentally compatible manner).

"Elastic," "elastomer" or "elastomeric" are used herein to refer to materials exhibiting elastic properties, which include any material that upon application of a force to its relaxed, initial length can stretch or elongate to an elongated length more than 10% greater than its initial length and will substantially recover back to about its initial length upon release of the applied force.

"Joined" is used herein to encompass configurations whereby an element is directly secured to another element by affixing the element directly to the other element, and configurations whereby an element is indirectly secured to another element by affixing the element to intermediate member(s) which in turn are affixed to the other element.

"Substrate" is used herein to describe a material which is primarily two-dimensional (i.e., in an XY plane) and whose thickness (in a Z direction) is relatively small (i.e. $\frac{1}{10}$ or less) in comparison to its length (in an X direction) and width (in a Y direction). Non-limiting examples of substrates include a web, layer or layers or fibrous materials, nonwovens, films, and foils such as polymeric films or metallic foils. These materials may be used alone or may comprise two or more layers laminated together. As such, a web is a substrate.

"Nonwoven" is used herein to refer to a material made from continuous (long) filaments (fibers) and/or discontinuous (short) filaments (fibers) by processes such as spunbonding, meltblowing, carding, and the like. Nonwovens do not have a woven or knitted filament pattern.

"Machine direction" (MD) is used herein to refer to the direction of material flow through a process. In addition, relative placement and movement of material can be described as flowing in the machine direction through a process from upstream in the process to downstream in the process.

"Cross direction" (CD) is used herein to refer to a direction that is generally perpendicular to the machine direction.

"Thermal conductivity" is used herein to refer to the quantity of heat transmitted due to a unit temperature gradient, in unit time under steady conditions in a direction normal to a surface of the unit area.

"Thermal diffusivity" is used herein to refer to the rate of transfer of heat of a material from the hot side to the cold side—a measure of how quickly a material can absorb heat from its surroundings. It can be calculated by taking the thermal conductivity divided by density and specific heat capacity at constant pressure.

Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

General Context

FIG. 1 is a schematic cross-sectional side view illustrating an example of an ultrasonic forming apparatus, which may benefit from the cooling methods according to various embodiments. As shown in FIG. 1, the apparatus 100 may include a first device 101 and a second device 102 with a nip 104 formed therebetween. The first device 101 may be an anvil roll comprising multiple hook-shaped or otherwise shaped cavities 107, along an outer periphery thereof. The second device 102 may be a source of vibrational energy, such as a sonotrode or a vibrating ultrasonic horn.

A substrate 106 may be positioned or passed through the nip 104. The substrate 106 may be, but need not be limited to, a film, sheet, web, nonwoven, composite, laminate, or other form, or may be portions of a film, sheet, web, nonwoven, laminate or substrate thermoplastic material, portions of which may be used as a component of a touch fastener, for instance on a absorbent article. In their use on absorbent article, touch fasteners may be attached to a "side tab" or "ear" that the consumer uses to secure the absorbent article the wearer. These tabs may be constructed with a piece of extensible material to allow the side tab to stretch and flex when attached or when the wearer moves. The touch fasteners may also be used in a two-point fastening system on an absorbent article, where the component is positioned on a landing zone or outer cover of the absorbent article. The present disclosure further contemplates the use of pre-formed film, sheet, web, composite, laminate, etc. as a substrate material.

During operation, the second device 102 is positioned in close proximity to an outer surface of the rotating first device 101 and in contact with the substrate 106 being processed. The first device 101 may also be a flat plate in other forms with the substrate moving over the flat plate. The second device 102 may be vibrated at frequencies between about 50 Hz to about 50 kHz, as required. A portion of the substrate 106 in contact with, or in proximity with, the first device 101 and second device 102 may be softened by the vibration energy from the second device 102 and a desired portion of the substrate may enter into the cavities 107 of the first device to be shaped into projections 109 on the front surface of the film or sheet 111 as the first device 101 rotates in the direction indicated in FIG. 1 by the arrows. This process may be referred to as rotary forming. Force may be exerted on the substrate 106 as it passes through the nip 104 to apply a requisite amount of pressure to the softened substrate 106 to assist its entry and filling of at least some of, or all of, the cavities 107. One example of the process is described in U.S. Pat. No. 8,784,722.

Figure 2:
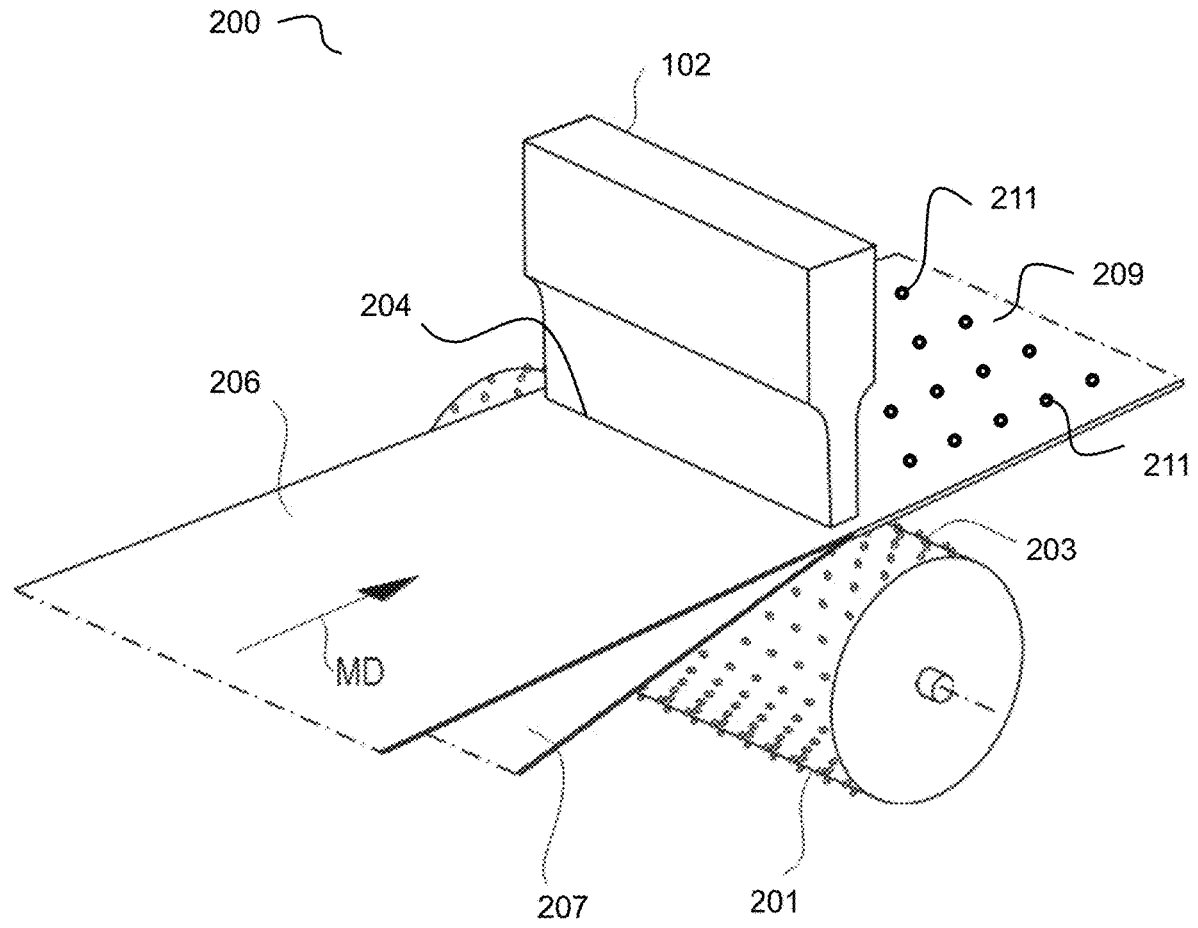
FIG. 2 is a schematic perspective view illustrating an example of an ultrasonic bonding apparatus, which may benefit from the cooling methods according to various embodiments.

FIG. 2 is a schematic view illustrating an example of an ultrasonic bonding apparatus 200, which may benefit from the cooling methods according to various embodiments. The apparatus 200 is somewhat similar to the apparatus 100 shown in FIG. 1 and all or some of the details discussed with respect to FIG. 1 apply to FIG. 2. The apparatus 200 comprises a first device 201 and a second device 102 positioned to form a nip 204 therebetween. The first device 201 may comprise an anvil roll comprising a plurality of nubs 203 positioned on an outer circumference. The second device may be identical to, or similar to, the second device 102 as described with reference to FIG. 1. One or more substrates, such as a first substrate 206 and/or a second substrate 207 may be positioned or passed through the nip 204 in a machine direction. During operation, the second device 102 is positioned in close proximity to the outer surface of the rotating first device 201 and in contact with, or in close proximately with, the substrates 206, 207 being processed. A portion of the substrates 206, 207 in contact with the first device 201 at the nubs 203 and the second device 102 may be softened by the vibration energy from the second device 202, thereby bonding the substrates 206, 207 together to form a bonded composite 209 comprising a plurality of bonds 211.

Discovery of Localized Overheating and Deformation

A serious need has been unexpectedly discovered for cooling methods and devices useful for ultrasonic forming and bonding of substrates. In this context, it has been discovered that the second device (for example, the sonotrode), which is normally stationary except for vibration, is susceptible to localized heating above the melting temperature of the polymer, which may lead to burn through in substrates where the second device may actually push through the molten polymer and directly contact the anvil. Equipment damage and substantial product quality defects such as large tears in substrates may occur in such cases. This burn-through problem limits the applied energy from a second device, such as a sonotrode, which in turn limits the line rate and throughput when making substrates. To process absorbent articles, and other goods, economically, very high line rates and throughputs are critical.

More specifically, it has been unexpectedly discovered that second devices, such as sonotrodes, may overheat in a small region adjacent to the projection or hook patch or bonded area. This localized overheating may lead to unintended melting, holes, and/or tears in the hook patch, or around the hook patch, or around bonded areas. It has further been discovered that this localized overheating may increase as line speed is increased. Frequent tears have been observed at the trailing edge of the hooks patch and sometimes tear outs of the entire patch have been observed.

Without being bound by theory, localized overheating appears to be influenced or caused by trade-offs between the fatigue life and the thermal conductivity when selecting a material or materials for construction of the second device. Other factors may also influence the thermal diffusivity of a particular second device, such as a particular sonotrode made from particular materials. These other factors may include but are not limited to the temperature, pressure, and composition of the surrounding air or environment, as well as the density of the sonotrode's structure. Comparisons between second devices, such as sonotrodes, comprising different materials should, therefore, be made between similar structures operating under similar environmental conditions.

Aluminum has a much higher thermal conductivity than does titanium. An aluminum sonotrode would not be expected to generate a hot spot over the hook patch or around bonded areas as readily as does a titanium sonotrode. As such, the present inventors would not expect tears when using an aluminum sonotrode based on modeling data. A trade-off exists, however, because aluminum has a limited fatigue life, and is normally not desired for sonotrodes in the nonwoven, film, and/or absorbent article industry, or other industries, which must operate at very high throughputs to be economical. The high throughputs required may severely shorten the life of a sonotrode with inadequate fatigue resistance.

In contrast to the hook/projection forming industry, most ultrasonic bonding processes on nonwovens, do not typically have this overheating problem until they are performed at high rates of speed. Ultrasonic bonding processes are typically used for bond patterns that are intermittent, typically at about 2% coverage. As used in this context, "coverage" refers to the percentage of material that is melted to form a bond between substrate layers. A typical bonding pattern for nonwoven materials is an 8 mm by 5 mm grid with a plurality of 0.5 mm interlayer bonds spaced throughout at a coverage of about 2% to about 5%. Components of absorbent articles, such as a patch comprising projections or hooks may have a much denser pattern. For example, projections or hooks for an absorbent article may cover a 30 mm machine direction by 20 mm cross direction patch of over 96% coverage of projections and hooks. As used in this context, "coverage" refers to the percentage of material that is melted to form a projection or a hook. In such applications, the energy density is much higher, and it has been discovered that a hot spot may form on or proximate to the working surface of the second device.

Figure 3:
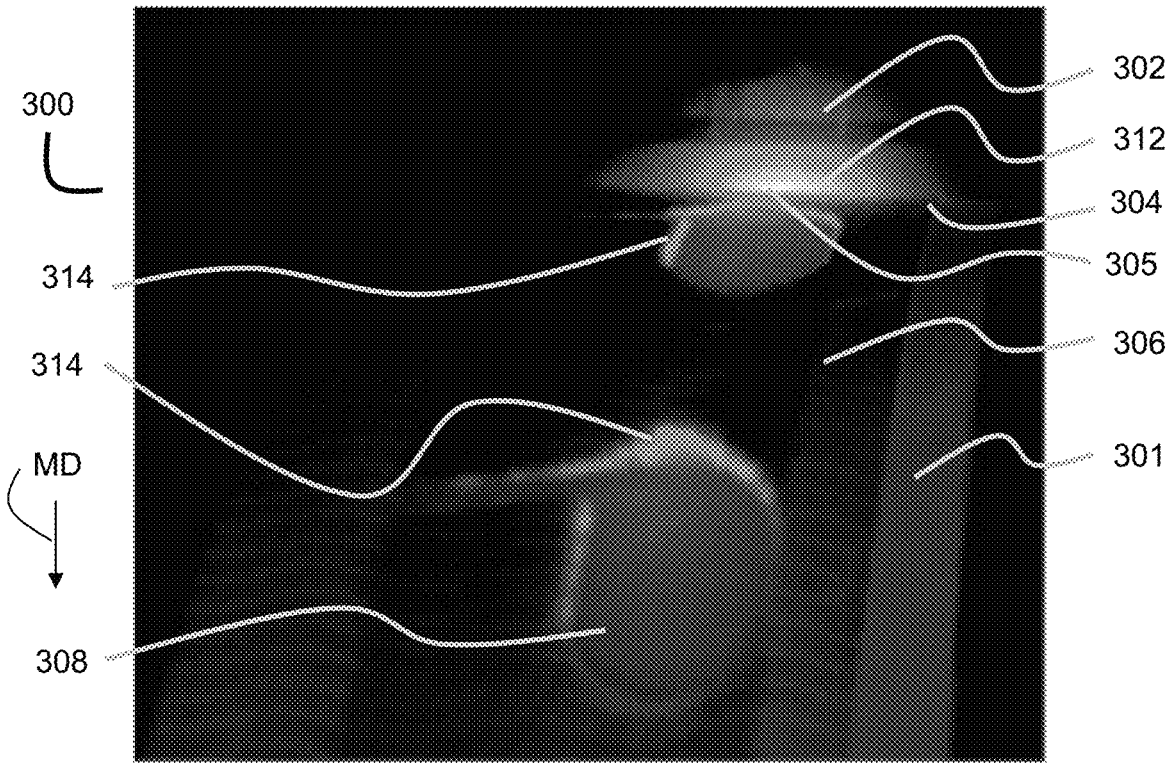
FIG. 3 is a still frame photograph from an infrared video observing an ultrasonic forming system.

FIG. 3 is a still frame photograph from an infrared video observing an ultrasonic bonding and forming system 300 for ultrasonic forming and bonding showing a substrate 306 (e.g., a landing zone for a taped absorbent article) passing through a nip 304 formed between a first device 301 and a second device 302 operating at ambient conditions. In the embodiment shown in FIG. 3, the first device 301 is a cylindrical rotating anvil and the second device 302 is titanium sonotrode. As the substrate 306 passes through the nip 304 in the machine direction a portion of the substrate 306 is heated and pressed against the first device 301 at a contact point 305 to fill cavities disposed at regular intervals along the outer circumference of the first device 301, thereby forming patches 308 of projections or hooks, which may be useful as a touch fastener in an absorbent article such as a diaper.

Still referring to FIG. 3, the original photograph includes an automatically generated gradient showing differing temperatures, in which black is less than 30 degrees Celsius, white is about 90 degrees Celsius. The gradient from low temperature to high temperature was automatically generated. A localized overheating region 312 is within about 8 mm to about 10 mm of the contact point 305 between the first device 301 (e.g., the anvil) and the second device 302 (e.g., the sonotrode). The localized overheating region 312 is characterized by an elevated temperature within a distance of the contact point 305. The elevated temperature of about 50 degrees Celsius or even about 70 degrees Celsius or up to about 150 to about 170 degrees Celsius, about 90 degrees Celsius to about 120 degrees Celsius, or about 100 degrees Celsius to about 110 degrees Celsius, specifically reciting all 1-degree Celsius increments within the above-recited ranges and all ranges formed therein or thereby. The distance may be within about 3 mm to about 15 mm of the contact point, specifically reciting all 0.1 mm increments within the above-recited ranges and all ranges formed therein or thereby. In other words, the localized overheating region is characterized by an elevated temperature of about 50 degrees Celsius or even about 70 degrees Celsius or up to about 150 to about 170 degrees Celsius within about 3 mm to about 5 mm of the contact point 305.

The localized overheating at region 312 causes excessive heating of the substrate 306, especially at burn-through regions 314, which may also be referred to as tears, or holes. The tears, rips, holes, or burn-through regions are considered defects by consumers and are highly undesirable. In the specific example shown in FIG. 3, it was observed that the temperature of the localized overheating region 312 at time the burn-through regions 314 were caused was about 90 to about 120 degrees Celsius. The trailing edge material of the burn-through region 314 on the patch as measured on IR camera was about 100 to about 110 degrees Celsius at the time the burn-through regions 314 were caused.

Figure 4:
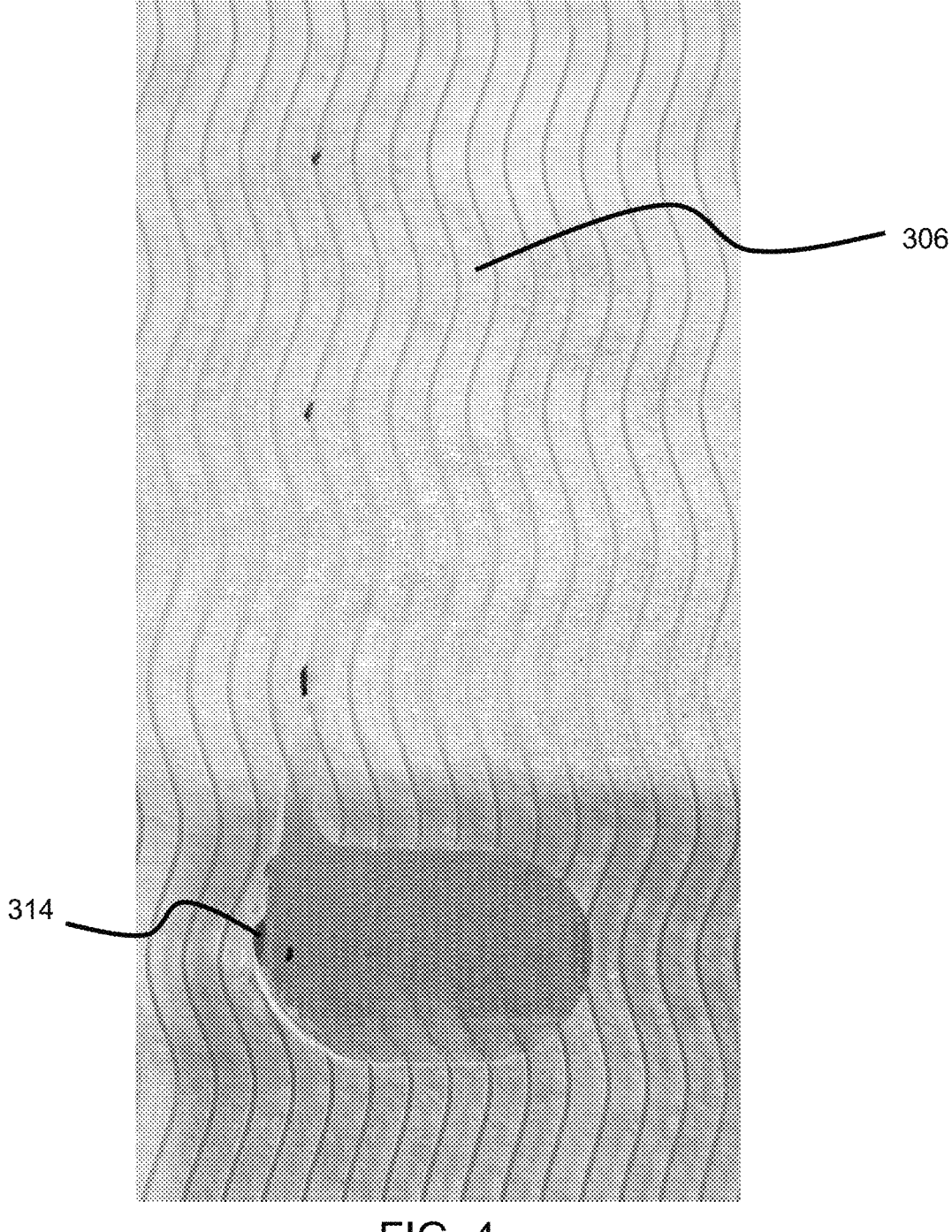
FIG. 4 is a photograph showing burn-through regions in the substrate from FIG. 3 after passing through the nip and being subjected to the localized overheating region.

FIG. 4 is a photograph showing burn-through regions 314 in the substrate 306 after passing through the nip 304 and being subjected to the localized overheating at the localized overheating region 312. The high-speed infrared video observations of the system 300 was the first evidence that the heating problem was one of localized heating in a small region of the sonotrode, i.e., the localized overheating region 312, about 20 mm wide, rather than heating of the entire 85 mm wide sonotrode.

It was further discovered that the localized heating of the second device also caused localized thermal deformation of the second device 302, which caused uneven and poor hook or projection formation. This poor quality was another major limiter of line speed.

The localized deformation of a titanium sonotrode at the localized overheating region was investigated in detail. The displacement of the sonotrode was large enough that hooks were no longer formed in the substrate. This deformation is believed to be in the range of about 10 microns to about 30 microns.

The specific titanium sonotrode observed had a characteristic length of 20 mm in the cross direction. It is noted that the coefficient of thermal expansion of titanium is $4.8 \times 10^{-6}$ m/(m-K). A peak temperature rise of about 140K was observed, which resulted in about a 13 micron CD length change manifesting as bowing of the sonotrode at the contact point. The degree of deformation was significant because the thickness of an example nonwoven substrate before passing through the nip is typically over 100 microns; the thickness of the nonwoven substrate after passing through the nip is about 50 microns, for regions outside of any hook formation region; and the thickness of the nonwoven substrate is only about 20 microns to 50 microns, or about 25 microns to about 45 microns after passing through the nip in regions in which hooks or projections are formed, specifically reciting all 1-micron increments within the above-recited ranges and all ranges formed therein or thereby.

Unsuccessful Attempts to Provide a Cooling Method

Figure 5:
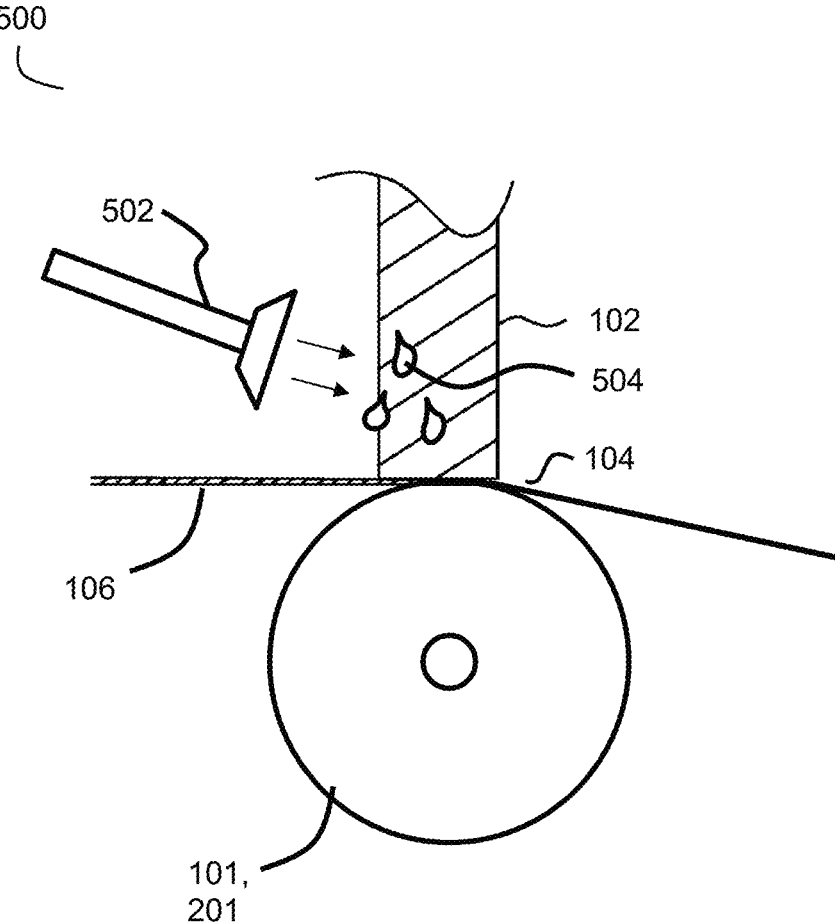
FIG. 5 is a schematic diagram illustrating an example of an unsuccessful air-cooling system.

The hot spot was attempted to be addresses using cold air blasts from a blower to generate an air flow, piping (for cold air), and air blast hoods mounted adjacent the sonotrode. FIG. 5 is schematic diagram illustrating an example of an unsuccessful air-cooling system 500. As illustrated a blower 502 was mounted and directed cold air, represented by arrows, at the second device 102. The present inventors then improved this cooling process with a larger commercial chiller for more cooling capacity, a larger blower for more air velocity to drive the convective heat transfer coefficient, and nozzles which focused the cold air on the hot spot of the sonotrode. This design has worked for line speeds of only about 30 m/min to about 40 m/min, which is not acceptable in absorbent article manufacturing or in other industries. A complication of the cold air blast may be condensation 504 forming on the sonotrode, which drips on the web. The water may interfere with the process and causes holes or tears in the hook patch.

Even after these attempts, a need remained for cooling methods and devices useful for ultrasonic forming and bonding of substrates.

Advantages of Cooling Methods According to Various Embodiments

Various embodiments provide cooling methods and associated devices that solve one or more of the above-mentioned problems.

Various embodiments described herein provide cooling methods that allow for the use of sonotrodes comprising a material having a low thermal conductivity. As used herein, "low thermal conductivity" refers to materials having a thermal conductivity of less than 100, less than 50, or less than 30 W/(m-K), but greater than 5 W/m-K), specifically reciting all 1 W/(m-K) increments within the above-recited ranges and all ranges formed therein or thereby. Some examples of low thermal conductivity materials that may be employed include but are not limited to steel, steel comprising carbon, steel comprising nickel, stainless steel, titanium, and combinations, coatings, or alloys thereof.

Of course, a material having a high thermal conductivity may also be employed, according to any embodiment described herein. As used herein, "high thermal conductivity" refers to materials having a thermal conductivity of greater than or equal to 150, or greater than or equal to 180 W/(m-K), but less than 2000 W/(m-K), specifically reciting all 1 W/(m-K) increments within the above-recited ranges and all ranges formed therein or thereby. Some examples high thermal conductivity materials that may be employed include but are not limited to diamond, sapphire, aluminum, copper, bronze, gold, silver, and combinations, coatings, or alloys thereof. Materials such as carbon-carbon composites may also be employed.

Alloying of various materials may, of course, result in a wide range of material densities, which results in different thermal diffusivities. Titanium alloys, useful according to various embodiments, may exhibit thermal diffusivities in a range of from about $1 \times 10^{-6}$ to about $3 \times 10^{-6}$ m$^2$/s. Steels, useful according to various embodiments, may exhibit thermal diffusivities in a range of from about $2 \times 10^{-6}$ to about $4 \times 10^{-6}$ m$^2$/s, specifically reciting all $1 \times 10^{-6}$ m$^2$/s increments within the above-recited ranges and all ranges formed therein or thereby. Aluminum alloys, useful according to various embodiments, may exhibit thermal diffusivities in a range of from about $2 \times 10^{-5}$ to about $9 \times 10^{-5}$ m$^2$/s, specifically reciting all $1 \times 10^{-5}$ m$^2$/s increments within the above-recited ranges and all ranges formed therein or thereby. Copper alloys, useful according to various embodiments, may exhibit thermal diffusivities in a range of from about $5 \times 10^{-5}$ to about $1 \times 10^{-4}$ m$^2$/s, specifically reciting all $1 \times 10^{-4}$ m$^2$/s increments within the above-recited ranges and all ranges formed therein or thereby. Sonotrodes according to various embodiments may comprise a material or only materials having a thermal diffusivity in a range of $1 \times 10^{-6}$ to about $5 \times 10^{-6}$ m$^2$/s. Heat sinks according to various embodiments may comprise a material or only materials having a thermal diffusivity in a range of $2 \times 10^{-5}$ to about $2 \times 10^{-4}$ m$^2$/s, specifically reciting all $1 \times 10^{-4}$ m$^2$/s increments within the above-recited ranges and all ranges formed therein or thereby.

Upon employing the cooling methods of various embodiments of the present disclosure, a coverage of over 70%, over 75%, over 80%, over 85%, over 90%, over 95%, over 96%, over 97%, over 98%, or over 99%, but less than 100%, specifically reciting all 0.1% increments within the above-recited ranges and all ranges formed therein or thereby, is possible without causing tears, rips, or holes in a substrate. These coverages are possible even at line speeds of about 10 m/min to about 70 m/min, about 10 m/min to about 150 m/min, about 10 m/min to about 400, m/min, about 100 m/min, or about 300 m/min to about 400 m/min, specifically reciting all 1 m/min increments within the above-recited ranges and all ranges formed therein or thereby for ultrasonic forming methods and apparatuses. These coverages and line speeds are possible even when using sonotrodes comprising a material having a high thermal conductivity or a low thermal conductivity as defined herein, including combinations and alloys thereof. Ultrasonic bonding methods and apparatuses, which require less coverage than forming methods and apparatuses may achieve line speeds of about 500 m/min to about 700 m/min, specifically reciting all 1 m/min increments within the above-recited ranges and all ranges formed therein or thereby.

It is to be appreciated that the cooling techniques and apparatuses according to various embodiments may be applied to ultrasonic bonding in general, including applications outside of the nonwoven, film, or absorbent article field. For ultrasonic bonding of nonwovens, burn-through often limits the ultrasonic force and amplitude in bonding applications, which in turn limits the energy input and line rate. Historically, ultrasonic bonding provides excellent bond strength, a soft aesthetic, and flexibility of pattern, but is often limited to rates slower than the 500 m/min to 700 m/min which is common in the absorbent article industry.

FIG. 6A is an example according to various embodiments illustrating a schematic cross-sectional diagram of a method for manufacturing portions of absorbent articles and an apparatus for altering a substrate for use in an absorbent article. The method and apparatus may be similar to the method and apparatus illustrated in FIG. 5, however, according to various embodiments, the second device 102 may comprise one or more projections 702 and/or one or more cavities 902. The cavities may extend in the machine direction and/or in the cross direction. A fluid, represented by arrows may be directed at the second device 102 and the one or more projections 702. Additionally or alternatively, a fluid may be conveyed through the one or more cavities 902. In either case, the fluid may help to cool the second device. In comparison to the system illustrated in FIG. 5, the fluid, such as air from a blower 502, may provide the same or similar degree of cooling without causing excessive condensation. Without being bound by theory, this improvement may be due, at least in part, to the increased surface area provided by the one or more projections 702, which allows a warmer fluid to provide the same degree of cooling. The fluid, according to any of these embodiments, may comprise water, air, glycol, a heat transfer oil, combinations thereof, or other suitable cooling fluids. The second device 102 may be covered in whole or in part with insulation 604, such as a foam rubber sheet, paper, or plastic. The insulation 604 may be useful to reduce or to prevent condensation, frost, or ice from accumulating.

Additionally or alternatively, the method may comprise conveying a first substrate 206 and a second substrate 207 as shown in FIG. 6B through the nip 204. In which case, the step of transmitting vibrational energy from the second device 102 toward the first device 201 via the nip 204 to alter the substrates may comprise bonding the first substrate 206 to the second substrate 207 via a plurality of bonds 211, as already discussed with respect to FIG. 2. All other aspects of the method and the apparatus may be substantially the same.

Heat Sinks Generally

With generalized reference to FIGS. 6-15, various embodiments relate to methods of manufacturing portions of absorbent articles or other goods. The method may include conveying a substrate 106 or a plurality of substrates 206, 207 through a nip 104, 204 formed between a first device 101, 201 and a second device 102; transmitting vibrational energy from the second device 102 toward the first device 101, 201 via the nip 104, 204 to alter the substrate, and cooling the second device 102 by transferring thermal energy from the second device 102 to a heat sink 602. Similarly, various embodiments relate to an apparatus 600, 700 for altering a substrate 106 or a plurality of substrates

206, 207 for use in an absorbent article. The method according to other embodiments may employ such an apparatus 600, 700. The apparatus 600, 700 may include a first device 101, 201; a second device 102 configured to transmit vibrational energy toward a nip 104, 204 formed therebetween; and a heat sink 602 thermally coupled to the second device 102 and configured to cool the second device 102 while the substrate 106 or the plurality of substrates 206, 207 pass through or the nip 104, 204 to be altered by the vibrational energy. As discussed with respect to FIGS. 1 and 2, the second device 102 may be a sonotrode and the vibrational energy may be ultrasonic energy. The transmission of vibrational energy from the second device 102 toward the first device 101, 201 via the nip 104, 204 to alter the substrate 106 or the plurality of substrates 206, 207 may be continuous or intermittent. Since the method and the apparatus 600, 700 according to various embodiments employ similar elements, the following discussion is intended to apply to all method embodiments and to all apparatus embodiments.

A significant benefit of various embodiments is that the second device 102 may include a material having a high thermal conductivity, a material having a low thermal conductivity, as well as combinations and alloys thereof. The material may include but is not limited to the specific examples of high thermal conductivity materials and low thermal conductivity materials described herein as well as combinations and alloys thereof. For example, the second device may comprise titanium or an alloy comprising titanium, which as already indicated may have a good fatigue life but a low thermal conductivity. According to various embodiments, despite employing a second device 102 that comprises a material having a low thermal conductivity, the problems associated with localized overheating and deformation may be eliminated, reduced, or substantially avoided.

Figure 6:
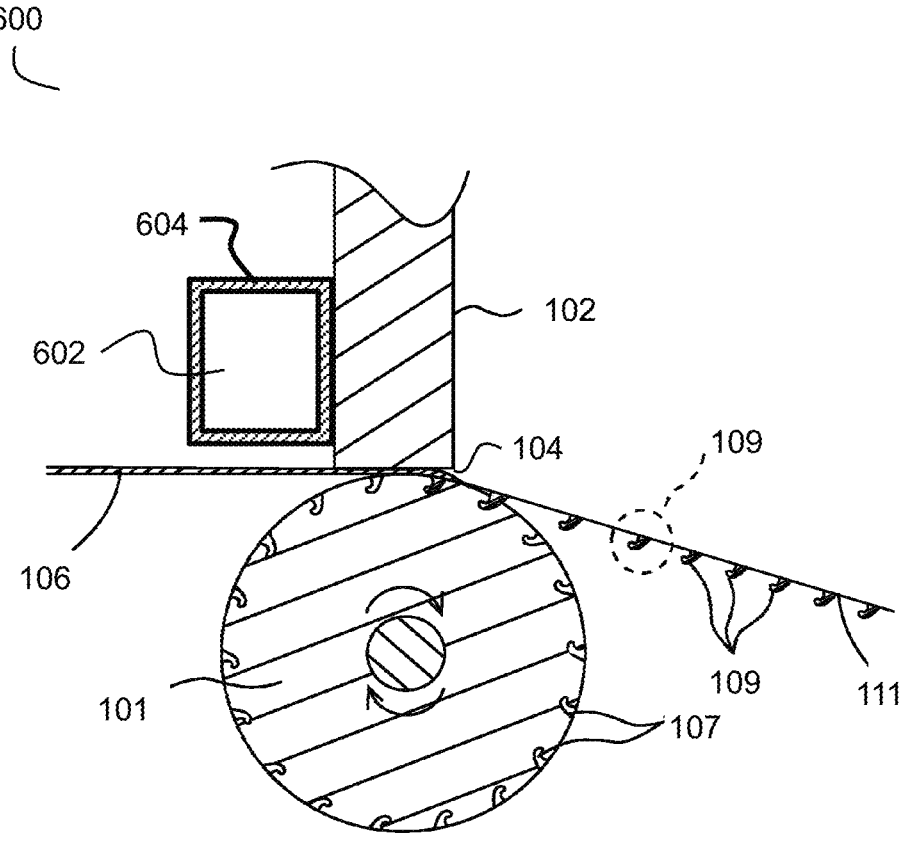
FIG. 6 is a schematic cross-sectional side view illustrating an example of a method and an ultrasonic forming apparatus, according to various embodiments.
Figure 7:
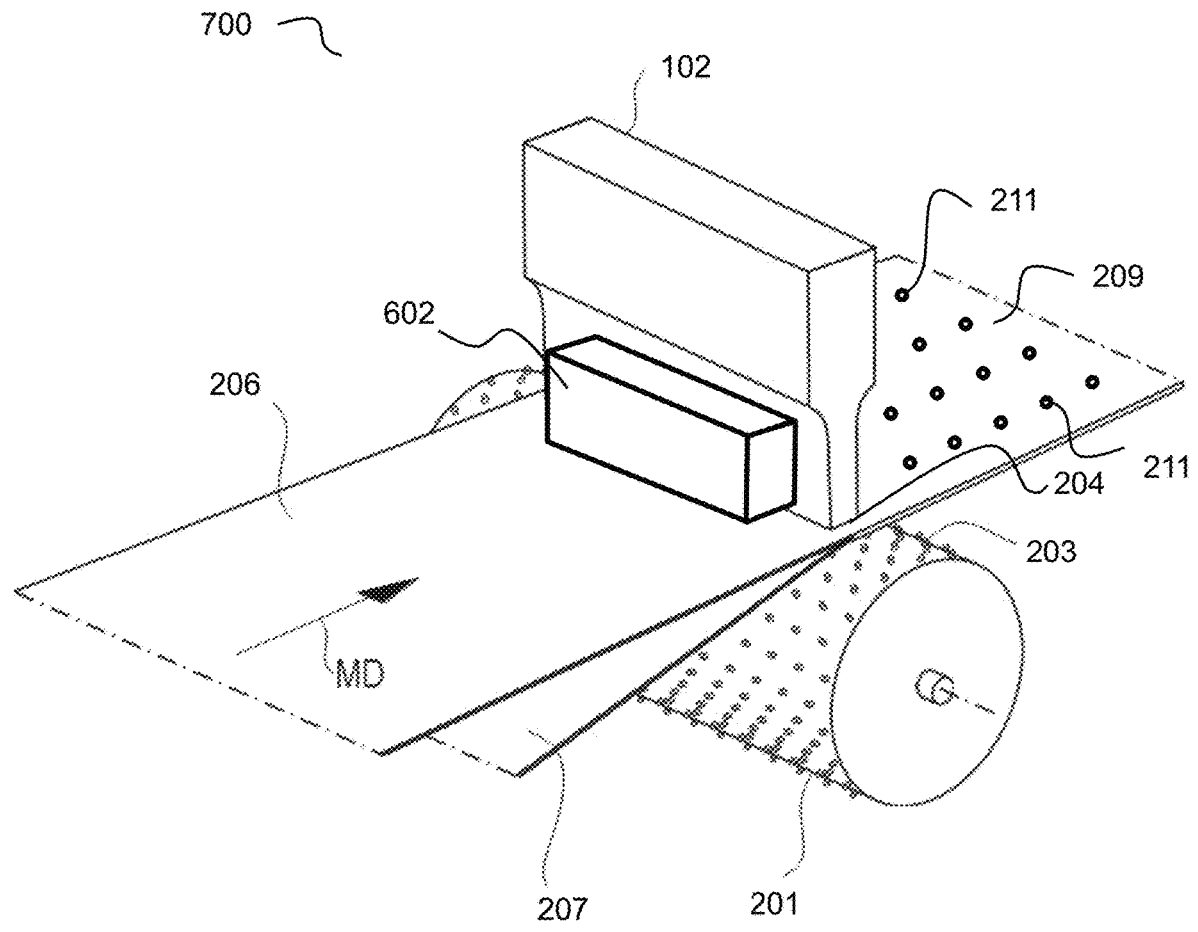
FIG. 7 is a schematic cross-sectional side view illustrating an example of a method and an ultrasonic bonding apparatus, according to various embodiments.

FIGS. 6 and 7 illustrate the general context for all of the method embodiments and for all of the apparatus embodiments. More specifically, FIG. 6 is a schematic cross-sectional side view illustrating an example of a method and an ultrasonic forming apparatus 600, according to various embodiments. The apparatus 600 includes a first device 101 and a second device 102 that are generally the same as already discussed with reference to FIG. 1. The first device 101 may include a plurality of recesses 107 in an outer surface of thereof. Each of the plurality of recesses 107 may have a shape configured to produce a projection 109 in the substrate 106 suitable for use in a touch fastener. The step of transmitting vibrational energy from the second device 102 toward the first device 101 via the nip 104 to alter the substrate 106 may include locally softening a portion of the substrate 106 to force a portion of softened material into the recesses 107 to form projections 109 suitable for use in a touch fastener. As will be discussed in greater detail, the apparatus 600 according to various embodiments may also include a heat sink 602.

The heat sink 602 may also be employed in the various bonding methods and/or as an element in the various bonding apparatuses described according to various embodiments. FIG. 7 is a schematic cross-sectional side view illustrating an example of a method and an ultrasonic bonding apparatus 700, according to various embodiments. The apparatus 700 includes a first device 201 and a second device 102 that are generally the same as, or similar to, that already discussed with reference to FIG. 1. In particular, the first device may comprise a plurality of nubs 203. A plurality of substrates, such as a first substrate 206 and a second substrate 207, may be conveyed through the nip 204. In such embodiments, the general step of transmitting vibrational energy from the second device 102 toward the first device 201 via the nip 204 to alter the substrates may include bonding the first substrate 206 to the second substrate 207.

The heat sinks 602 according to any of the embodiments described herein may be covered with insulation 604, such as a foam rubber sheet, paper, or plastic. The insulation 604 may be useful to reduce or to prevent condensation.

Heat Sink Materials

According to various embodiments, the heat sink 602 may comprise any of the high thermal conductivity or low thermal conductivity materials listed herein. Preferably, the heat sink 602 may include a material having a thermal conductivity higher than a thermal conductivity of a primary material of the second device 102. For example, the heat sink 602 may comprise aluminum or brass, thereby providing a higher thermal conductivity than a second device primarily comprising titanium. In this context the term "primary material" refers to the material that constitutes the majority of the relevant regions of the second device 102 or to the material that most influences the overall thermal conductivity of the relevant regions of the second device 102. The relevant regions of the second device 102 are the regions that need to be cooled, for example, the areas of the second device 102 in which a localized overheating or deformation is to be reduced or prevented.

Vibrationally Isolated Heat Sinks

The heat sink 602 may be substantially isolated from the vibrational energy produced by or transmitted via the second device 102. As used herein, the term "substantially isolated" does not necessarily mean that the heat sink 602 is not in direct or indirect contact with the second device 102, but rather that the heat sink 602 remains substantially stationary relative to the vibrating second device 102, such that it generally does not vibrate with the second device 102. Without being bound by theory, substantial isolation of the heat sink from the vibrational energy produced by or transmitted via the second device 102 may be due to one or more of the following considerations: (1) heat sink 602 contacts the second device 102 on a plane that is parallel to a line of action of the ultrasonic displacement of the second device 102, which minimizes the force applied to the heat sink 602; (2) an impedance mismatch may be present between the material of construction of the heat sink 602, such as for example titanium, and the buffer material; and (3) the buffer material may be deflected to absorb energy from the heat sink 602. The heat sink 602 may be in contact with the second device 102. The heat sink 602 may have a coefficient of friction in the range of about 0.05 to about 0.5, specifically reciting all 0.01 increments within the above-recited ranges and all ranges formed therein or thereby. The coefficient of friction may be low enough such that even though the heat sink 602 is in contact with the second device 102, the heat sink 602 remains substantially isolated from the vibrational energy produced by or transmitted via the second device 102. As will be discussed, in greater detail hereinafter, a buffer material may optionally be disposed between the heat sink 602 and the second device 102.

Buffer Materials

A sonotrode, which is an example of a second device according to various embodiments, functions by vibrating at a resonance frequency. The resonance frequency is dependent on geometry and mass in different regions of the sonotrode. Just like a musical instrument, each CNC machined sonotrode is individually tuned to ensure an even displacement magnitude across the working surface. A body of art exists for such practices. Attaching an additional mass, such as a heatsink, to the tuned sonotrode is quite counter-intuitive.

According to various embodiments, a buffer material may be positioned intermediate the heat sink and the second device. The method may comprise cooling the second device by transferring the thermal energy from the second device through a buffer material to the heat sink. The buffer material may provide a sufficient range of motion for the sonotrode to vibrate in a first direction, while a stationary heat sink is applied adjacent the sonotrode with a contact plane whose direction vector is orthogonal to the first direction. According to various embodiments, there may be nominally no reaction force from the fixed heat sink to the vibration of the second device, other than a minor viscous lose due to shearing of the fluid coupling. The buffer material may be conductive. The buffer material may be a fluid, such as a thermal grease. The buffer material may be a thick thermal paste, which may not be considered a fluid, is preferred. For example, the buffer material may comprise THERMAL-TAKE® TG-50, ARCTIC® MX-2, or multiple component mixture of conductive particles in a carrier grease. Such thermal pastes may avoid cavitation of the buffer material. For example, the buffer material may comprise a silicone lubricant, such as for example DOW CORNING® 111 compound. The buffer material may comprise a multiphase mixture, with conductive solid particles, such as diamond or aluminum oxide, for example.

The buffer material may be a deformable material. For example, a slip layer may be used as a buffer material in addition to or as an alternative to a fluid such as a grease or a thermal paste. For instance, a thin sheet of paper between heat sink and the sonotrode may be used. A buffer material may comprise a paper or fibrous media wetted with a fluid, such as grease or a paste. Keeping the system dry would eliminate any risk of the fluid contaminating the workpiece. Fluids on the side of the sonotrode tend to form droplets which move, even against gravity, due to the ultrasonics. For example, grease on the side of the sonotrode may form droplets due to surface tension, which will then move towards the contact point.

Figure 8:
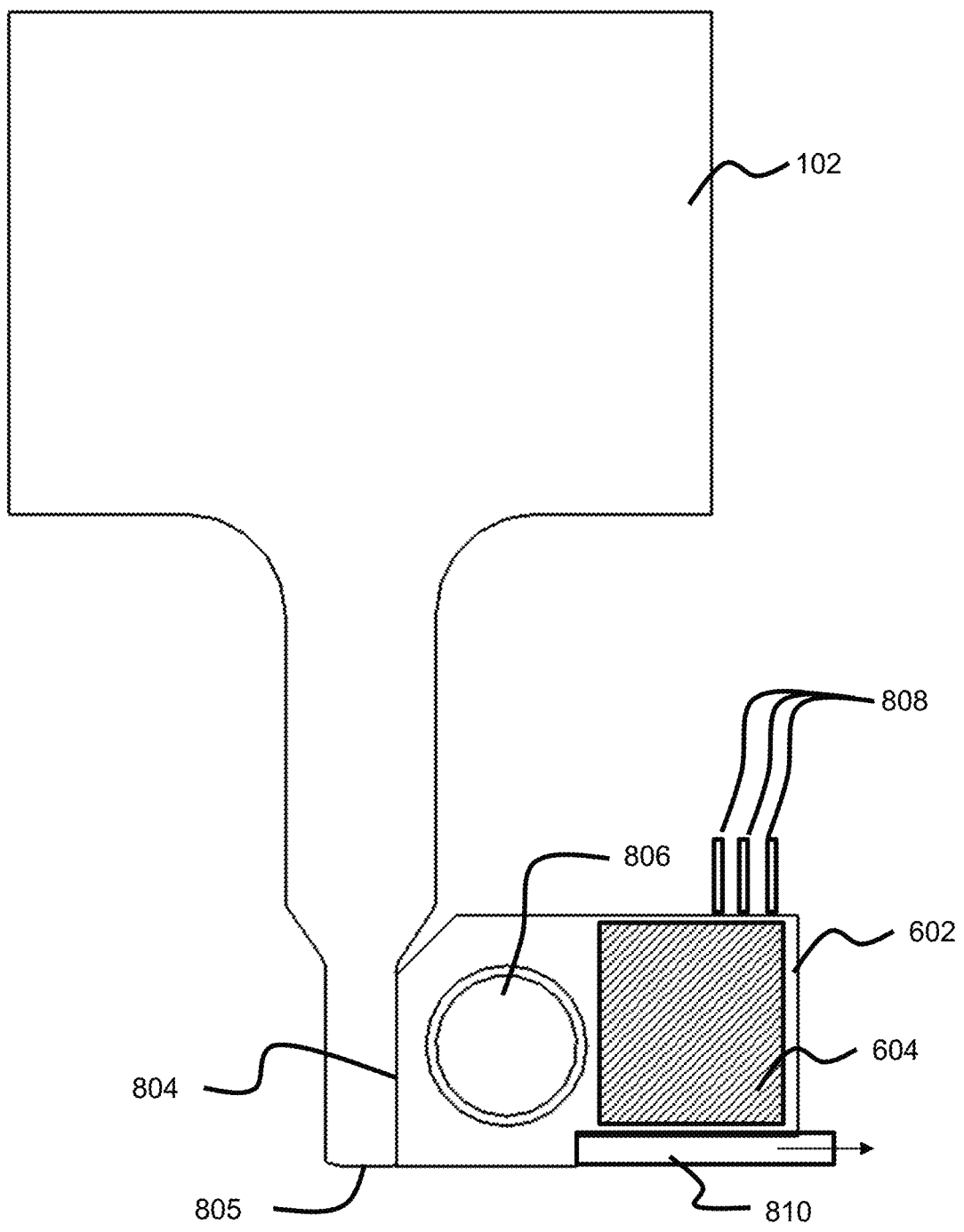
FIG. 8 is an example according to various embodiments illustrating a side view of a heat sink in association with a second device according to various embodiments.
Figure 9:
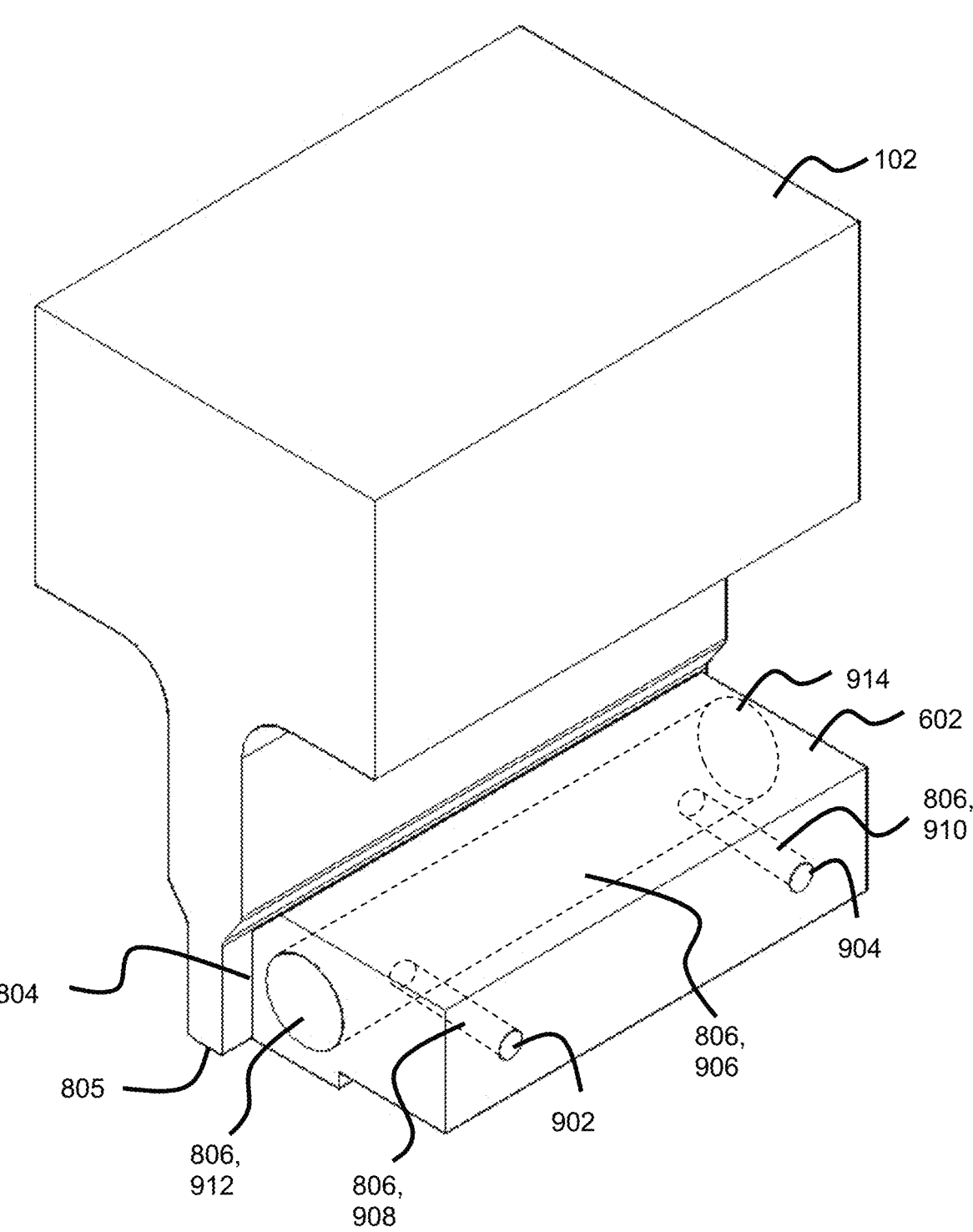
FIG. 9 is an example according to various embodiments illustrating an isometric view of a heat sink in association with a second device according to various embodiments.

Various embodiments may relate to an apparatus for altering a substrate for an absorbent article, comprising: a first device, a second device configured to transmit vibrational energy toward a nip formed between the second device and the first device, a heat sink thermally coupled to the second device, and a buffer material positioned intermediate the heat sink and the second device, wherein the heat sink is configured to cool the second device by transferring thermal energy from the second device through the buffer material to the heat sink while a substrate is conveyed through the nip to be altered by the vibrational energy. For example, FIG. 8 is an example according to various embodiments illustrating a side view of a heat sink 602 in association with a second device 102 according to various embodiments. FIG. 9 is an example according to various embodiments illustrating an isometric view of a heat sink 602 in association with a second device 102 according to various embodiments. The heat sink 602 may be disposed adjacent to a contact point 805, which corresponds to the contact point 305 illustrated in FIG. 3. A buffer material 804 may be disposed between the heat sink 602 and the second device 102. As already described, as a substrate passes through the nip a portion of the substrate may be heated and pressed against the first device at the contact point 805. The contact point 805 is also the point at which localized overheating and deformation has been observed. Targeted cooling in this area is, therefore, an aspect of various embodiments.

Heat Sink with Projections or Fins

Referring again to FIG. 8, a heat sink 602, according to various embodiments may comprise one or more projections or fins 808 extending from the heat sink to cool the heat sink. The methods according to various embodiments may include providing the one or more projections 808 extending from the heat sink 602, and conveying a fluid, such as air, over the one or more projections to cool the heat sink 602. It is to be appreciated that the particular configuration shown in FIG. 8 merely illustrates the concept and that the projections or fins 808 may be arranged in any desirable configuration and that any desirable number of projections 808 having any suitable size and shape may be employed. The projections 808 may comprise the same or a different material as the heat sink 602 and may be thermally coupled thereto to allow for efficient transfer of thermal energy from the heat sink to the projections 808. The projections 808 may provide increased surface area for interaction with ambient air or with any fluid that is conveyed over the surface thereof to improve heat transfer.

Heat Sinks with Cavities

Referring to FIG. 8 and FIG. 9 the heat sink 602, according to various embodiments, may comprise one or more internal cavities 806. The internal cavities 806 may comprise a plurality of interconnected internal segments to allow a fluid to flow through the heat sink 602. For example, as shown in FIG. 9, the heat sink 602 may comprise a main segment 906 as well as an inlet segment 908 and an outlet segment 910. The inlet segment 908 may be fluidically coupled to the main segment as well as to an inlet 902 formed in a surface of the heat sink 602. The outlet segment 910 may be fluidically coupled to the main segment as well as to an outlet 904 formed in a surface of the heat sink 602. The main segment 906 may optionally include an inlet 912 and an outlet 914 formed in a surface of the heat sink 602. The inlets and outlets may be plugged as needed or may be fluidically coupled to piping or tubing suitable to transfer fluids into and out of the heat sink 602. It is to be appreciated that the specific configuration shown in FIG. 9 is conceptual and that any configuration of internal cavities may be employed. For example, the cavities may provide a tortuous path through the heat sink. In general, it is to be appreciated that the method according to various embodiments may comprise providing a cavity or a plurality of cavities in the heat sink and conveying a cooling fluid through the cavity to cool the heat sink. The cooling fluid may be any suitable cooling fluid, such as cooled air, glycol, or any suitable heat transfer fluid or oil. The apparatus according to various embodiments may comprise a cavity or a plurality of cavities defined in the heat sink to cool the heat sink.

One advantages of utilizing a heat transfer fluid or oil and/or glycol is that the heat sink may easily be cooled below the freezing point of water at standard temperature and pressure, providing a larger temperature difference to drive higher heat transfer rates. At such low temperatures it is possible for frost or ice to form on or around the heat sink when the system is idle. When the system is running the heat generated from the second device counterbalances any tendency for frost or ice to form. Depending on the extent to which the system must be idle, icing may limit the practical glycol temperature to about 1 degree Celsius. Cooling may be reduced or turned off at idle. It is possible, according to various embodiments to mitigate these effects. For example, a continuous drain 810 may be employed to drain any melted liquid. It is also possible to provide insulation 604 on all or a part of the heat sink 602.

Alternative Methods for Thermal Coupling of Heat Sinks

Figure 10:
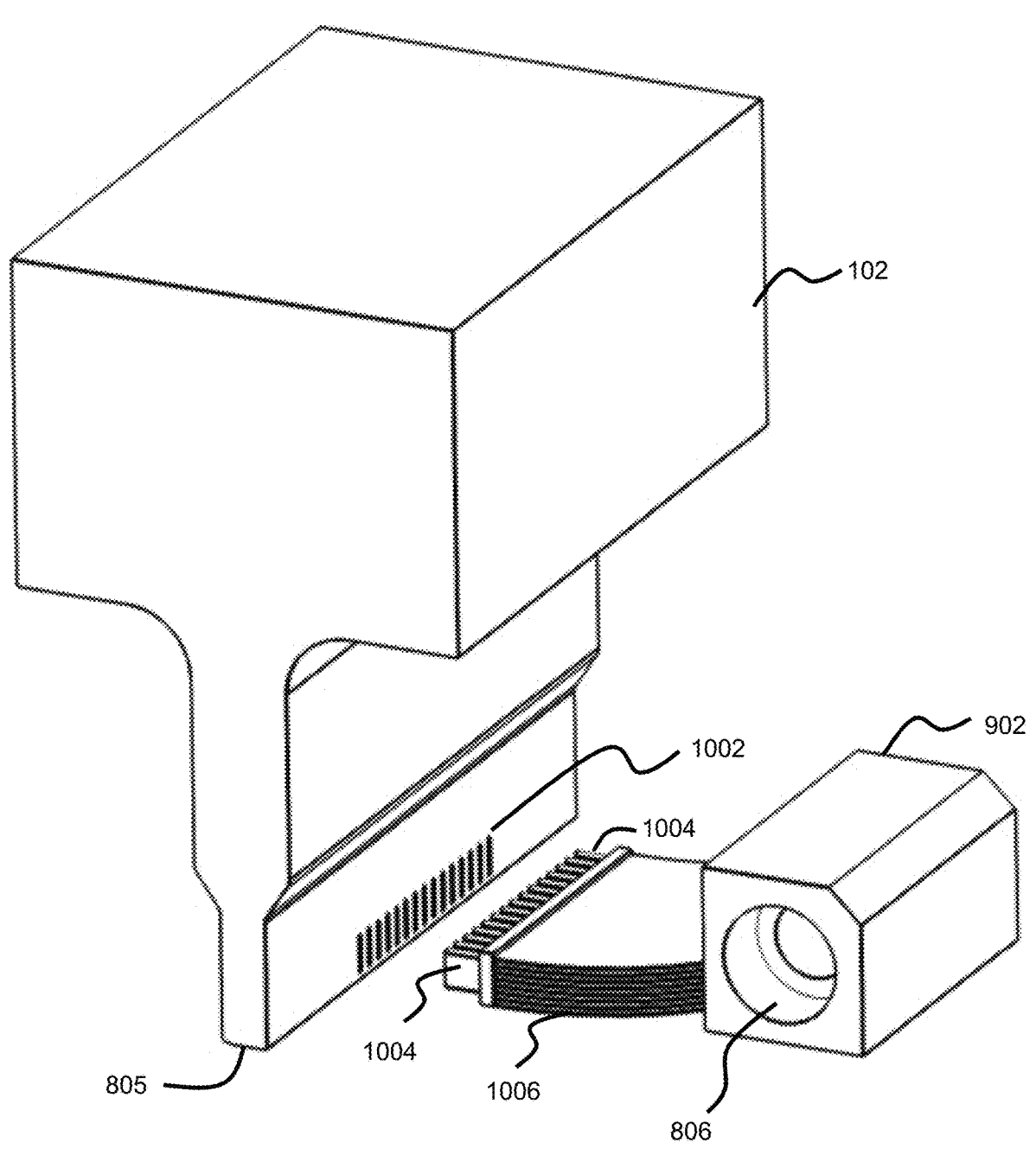
FIG. 10 is an example according to various embodiments illustrating a heat sink comprising a plurality of thermally conductive fins aligned with a plurality of slots on a second device.
Figure 11:
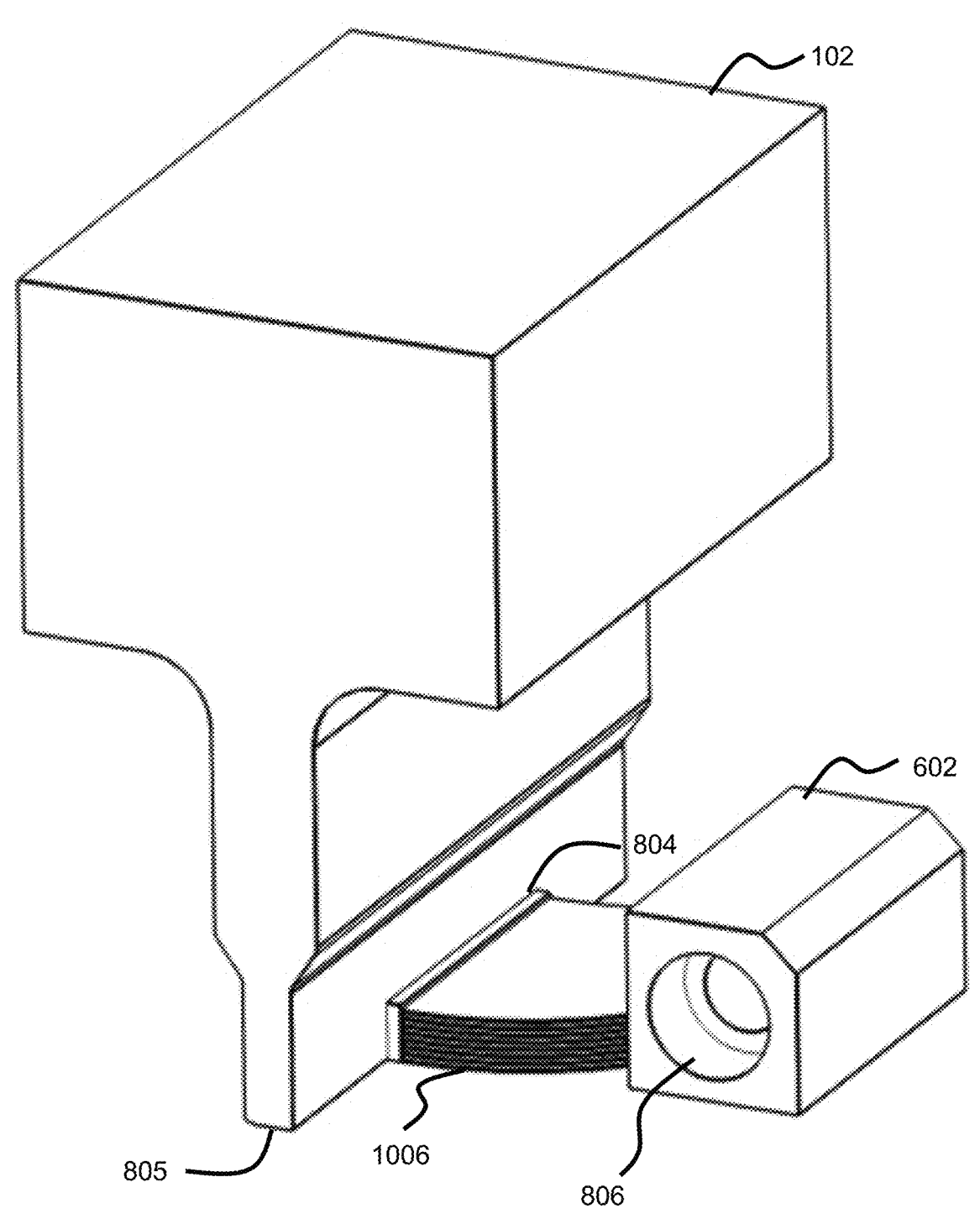
FIG. 11 is an example according to various embodiments illustrating a heat sink comprising a plurality of thermally conductive fins inserted into a plurality of slots on a second device.

With reference to FIGS. 10 to 13, various embodiments may employ interconnecting slots and fins to thermally couple heat sinks and second devices. More specifically, FIG. 10 is an example according to various embodiments illustrating a heat sink 602 comprising a plurality of thermally conductive fins 1004 aligned with a plurality of slots 1002 on a second device 102. FIG. 11 is identical to FIG. 10, except that the plurality of fins (not visible) are shown inserted into the plurality of slots on a second device. Any of the buffer materials 804 described herein may be interposed between the fins and the slots. For example, according to various embodiments, a thermal paste may be employed to allow relative vibratory motion. The fins 1004 may extend from the heat sink via a conductive bridge 1006. The fins 1004 and/or the conductive bridge 1006 may comprise the same or different materials as the heat sink 602.

Figure 12:
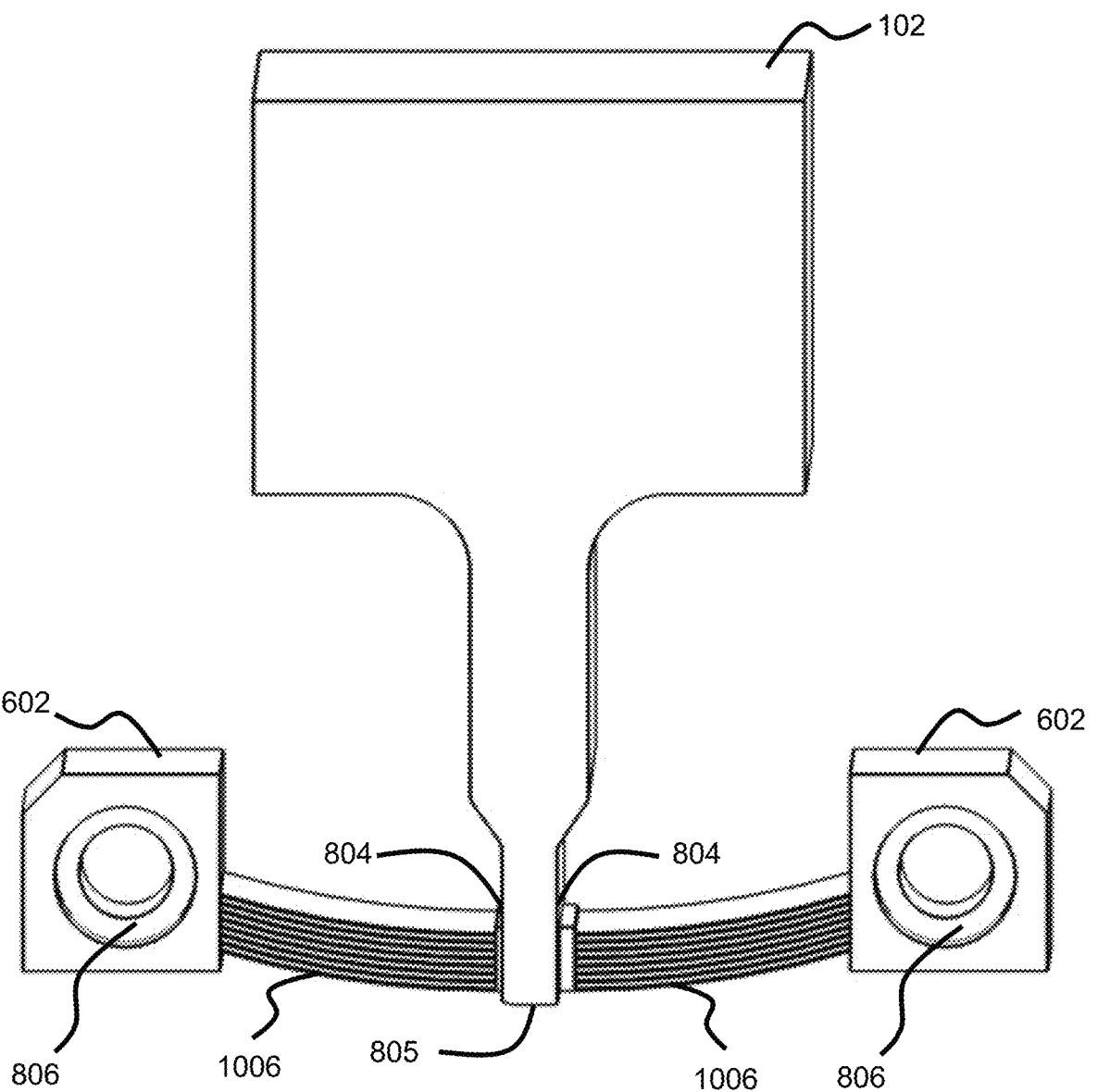
FIG. 12 is an example according to various embodiments illustrating two heat sinks comprising a plurality of thermally conductive fins inserted into a plurality of slots on a second device from both sides.
Figure 13:
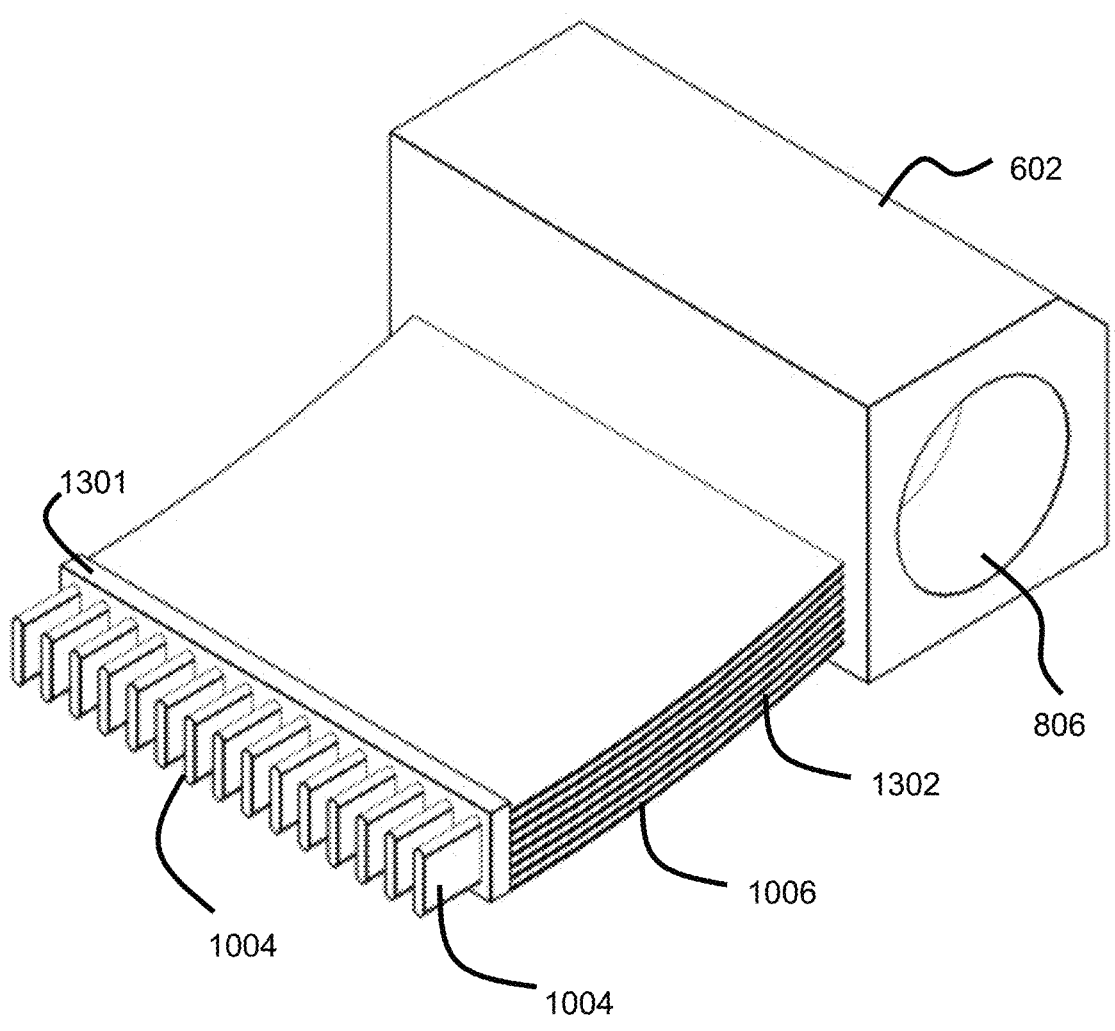
FIG. 13 is an example according to various embodiments illustrating an isometric view of a heat sink comprising a plurality of thermally conductive fins.

FIG. 12 is an example according to various embodiments illustrating two heat sinks 602 comprising a plurality of thermally conductive fins (not visible) inserted into a plurality of slots 1002 on a second device 102 from both sides. FIG. 13 is an example according to various embodiments illustrating an isometric view of a heat sink 602 comprising a plurality of thermally conductive fins 1004 and showing additional details of the conductive bridge 1006. The fins 1004 may be directly connected to the conductive bridge 1006 or may be connected to the conductive bridge 1006 via a plate 1301. The plate 1301 may be integral or separate from the fins 1004. The plate 1301 may comprise the same or different materials as the fins 1004 or the conductive bridge 1006. According to various embodiments, the fins may comprise aluminum, copper, combinations, and alloys thereof.

The conductive bridge 1006 may be solid or may comprise a plurality of deformable fingers 1302. The plurality of deformable fingers 1302 may comprise any suitable material. For example, a copper or brass block may be formed into a plurality of deformable fingers via electrical discharge machining, having a structure similar to a common hair comb. Use of electrical discharge machining is not mandatory, because according to various embodiments, the same effect may be accomplished by stacking sheets of a conductive material (e.g. aluminum sheet metal). Spacers may also be used between operative sheets to provide deflection. The spacing may be via thin spacer sheets, which may optionally be only at one end of the conductive bridge 1006. The alternating sheets may be any suitable material, including for example aluminum, brass, or copper sheet metal with paper or plastic shim stock intermediate. The plurality of deformable fingers of the conductive bridge 1006 may be cut from a single block, which may improve tolerances. For example, the deformable elements may be sheets cut from a conductive block, such as aluminum or copper. The conductive block may contain a chilled glycol passage, which may be on the fixed end. The cutting of the fingers may be via wire electrical discharge machining. These spring elements may be configured to deflect or accommodate the amplitude of the ultrasonic vibration (e.g. 48 micron zero-peak) with very low reaction forces upon the sonotrode and peak stresses below the yield or fatigue strength of the deformable material. It is to be appreciated that the specific configuration illustrated in FIGS. 10 to 13 is conceptual and that the heat sink 602 may be thermally coupled to the second device 102 in any desirable manner. As has been discussed, it is desirable to thermally couple the heat sink 602 to the second device 102 at a position that is adjacent to the contact point 805 where localized cooling and deformation has been discovered.

Sonotrodes are normally solid, except for slots which function as wave guides. The location and size of such waveguide slots is a key factor in sonotrode design, and very complex arrangements are common. The additional slots 1002 in the sonotrode, according to various embodiments, may enable convective cooling via a cold air blast. The slots 1002 may provide a shorter path length from the localized hot spots near the contact point 805 on the working surface of the second device 102 to the cooling medium or heat sink 602.

Heat Sinks Having Deformable Elements

Figure 14:
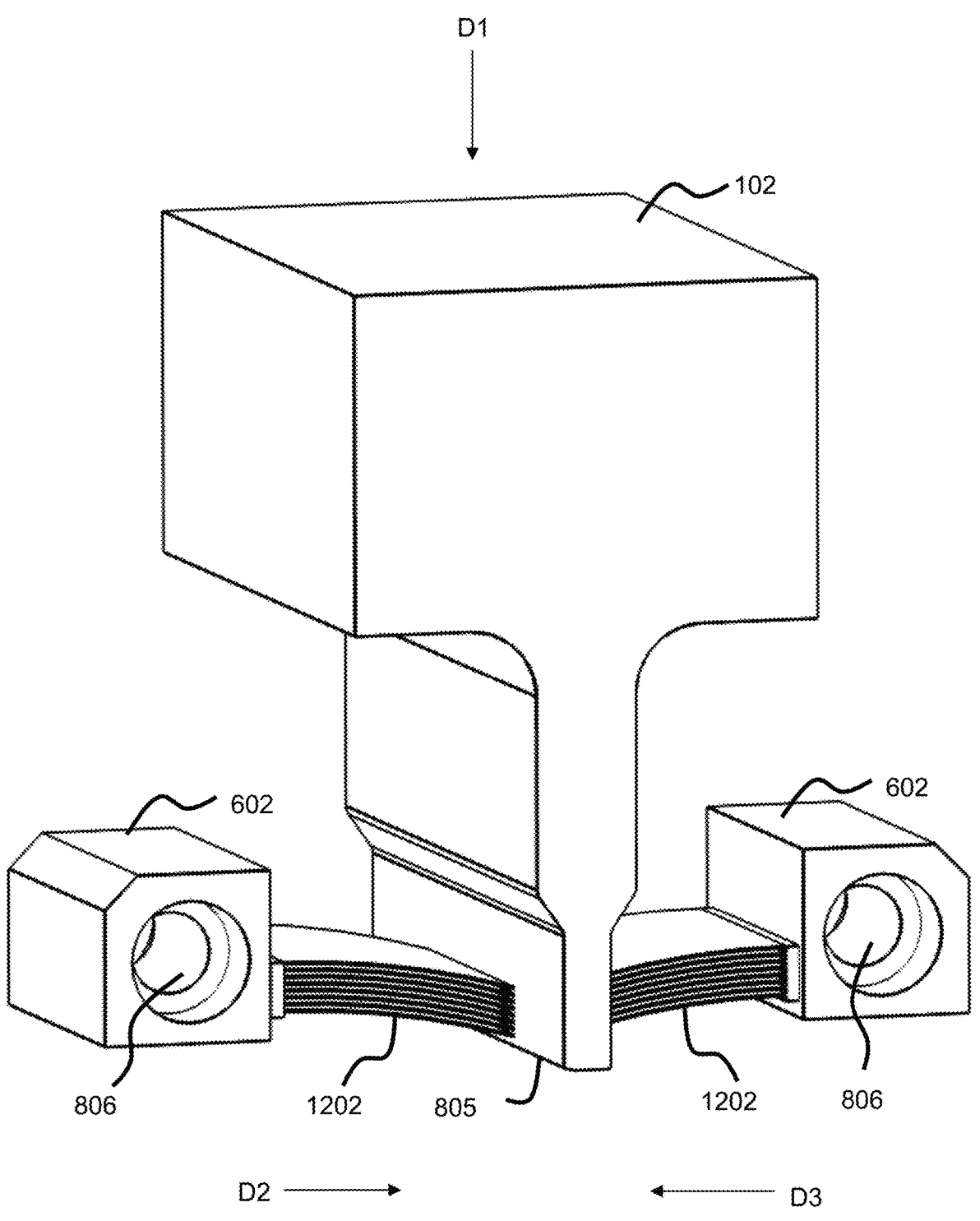
FIG. 14 is an example according to various embodiments illustrating a plurality of heat sinks in association with a second device.
Figure 15:
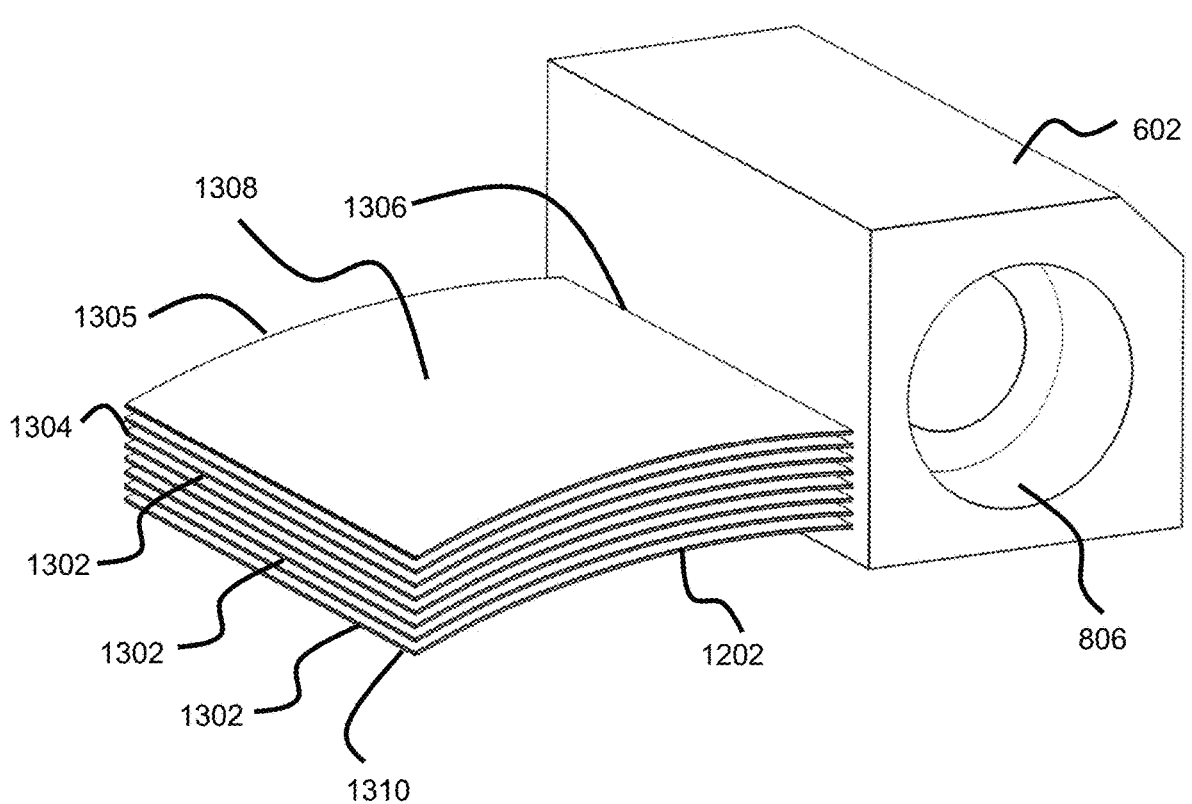
FIG. 15 is an example according to various embodiments illustrating a heat sink including a deformable heat transfer element comprising a plurality of deformable fingers.

Referring to FIGS. 14 and 15, various embodiments may employ heat sinks having deformable elements, which may be utilize in addition to or instead of a buffer material. According to various embodiments, eliminating the buffer material may be desirable. For example, the buffer material may abrade, cavitate, wear, harden, or flow out of the joint over time and usage. The buffer material may pose a risk of product contamination. A second device, such as a sonotrode, may be damaged by fretting corrosion at the interface with the buffer material and/or heat sink. More specifically, FIG. 14 is an example according to various embodiments illustrating a plurality of heat sinks 602 in association with a second device 102. FIG. 15 is an example according to various embodiments illustrating a heat sink 602 comprising a deformable heat transfer element 1202 comprising a plurality of deformable fingers 1302. The deformable elements 1202 may be manufactured using electrical discharge machining process and may comprise the same or different material as the heat sink 602.

According to various embodiments a deformable heat transfer element 1202 may be used in association with a heat sink 602, with a first portion 1304 of the deformable element 1202 vibrating with the second device 102 and a second portion 1306 associated with the heat sink 602 not vibrating. The second portion 1304 of the heat sink may be fixed and may be provided with a cooling source (e.g., chilled glycol, or cold air). An intermediate portion 1305 of the deformable element 1202 between these regions may be deformable, or spring like.

For example, a copper or brass block may be formed into a plurality of deformable fingers via electrical discharge machining, having a structure similar to a common hair comb. The fingers 1302 may be adjacent to the heat sink 602, and may move freely with it, while still conducting heat. Use of electrical discharge machining is not mandatory, because according to various embodiments, the same effect may be accomplished by stacking sheets of a conductive material (e.g. aluminum sheet metal). Spacers may also be used between operative sheets to provide deflection. The spacing may be via thin spacer sheets, which may optionally be only at one end of the deformable element 1202. The alternating sheets may be any suitable material, including for example aluminum, brass, or copper sheet metal with paper or plastic shim stock intermediate. The deformable elements may be cut from a single block, which may improve tolerances. For example, the deformable elements may be sheets cut from a conductive block, such as aluminum or copper. The conductive block may contain a chilled glycol passage, which may be on the fixed end. The cutting of the fingers may be via wire electrical discharge machining. These spring elements may be configured to deflect or accommodate the amplitude of the ultrasonic vibration (e.g.

48 micron zero-peak) with very low reaction forces upon the sonotrode and peak stresses below the yield or fatigue strength of the deformable material.

The heat sinks according to any of the embodiments described herein may be covered with insulation 604, such as a foam rubber sheet, paper, or plastic. The insulation 604 may be useful to reduce or to prevent condensation. The insulation 604 may also be applied to some of the deformable elements 1202. The top deformable finger or sheet 1308 and/or the bottom deformable finger or sheet 1310, for example, may comprise a material with a lower thermal conductivity. According to various embodiments, the top deformable finger or sheet 1308 and/or the bottom deformable finger or sheet 1601 may not be operatively connected to the heat sink 602.

The deformable elements 1202 may be curved or actuate. The deformable elements 1202 may be loaded against the second device 102 in a direction D2, D3 inclined at an angle relative to or orthogonal to the direction D1 of ultrasonic vibration. The angle may be in a range of from 1 to 90 degrees, specifically reciting all 1-degree increments within the above-recited ranges and all ranges formed therein or thereby. There may be a pre-loading force that ensures contact between the vibrating second device 602 and the deformable elements 1202. The deformable elements 1202 may have a free end or may contain multiple voids between deformable elements. Where a deformable free end is used, the deformable end may be at the second device side 1304 or at the fixed mounting side at the second portion 1306. The deformable elements 1202 may originate from a surface of a conductive body mounted to the second device. The conductive body may also have one or more protrusions, which may insert into recesses or voids in the second device. A buffer material may or may not be used between these protrusions and the second device recesses. These protrusions from a surface of the heat sink body may be closer to the contact surface of the second device with the workpiece, and therefore may conduct heat away from the localized hot spot. These protrusions may locate the heat sink on the second device, which may be in combination with a preload of the deformable elements 1202 substantially orthogonal to the vibration direction.

Any or all of the deformable fingers 1302 may have a cantilevered length of from about 0.005 m to about 0.1 m, specifically reciting all 0.01 m increments within the specified ranges and all ranges formed therein or thereby.

Any or all of the deformable fingers 1302 may have a cantilevered width of from about 0.0005 m to about 0.1 m, specifically reciting all 0.01 m increments within the specified ranges and all ranges formed therein or thereby.

Any or all of the deformable fingers 1302 may have a thickness of from about 0.0001 m to 0.5 m, specifically reciting all 0.0001 m increments within the specified ranges and all ranges formed therein or thereby.

The second portion 1306 of the deformable element 1202 associated with the heat sink 602 may have a heat sink contact height on the second device of from about 10 mm to about 30 mm, specifically reciting all 1 mm increments within the specified ranges and all ranges formed therein or thereby. In other words, the stack of deformable fingers 1302 that constitute the deformable element 1202 may have the above-referenced contact height.

The plurality of deformable fingers 1302 may be spaced at increments of from about 0.05 to about 0.5 mm, specifically reciting all 0.01 mm increments within the specified ranges and all ranges formed therein or thereby.

The plurality of deformable fingers 1302 may include a total number of deformable fingers 1302 of from 10 to 100, specifically reciting all 1-unit increments within the specified ranges and all ranges formed therein or thereby.

Any or all of the plurality of deformable fingers 1302 may exhibit an elastic modulus of from about 50 to about 100 GPa, specifically reciting all 1 GPa increments within the specified ranges and all ranges formed therein or thereby.

Multiple Heat Sinks

It is to be appreciated that multiple heat sinks may be employed according to any of the various embodiments. For example, the apparatus according to any of the embodiments described herein may comprise a plurality of heat sinks, such as for example a first heat sink and a second heat sink. Each of the plurality of heat sinks may be associated with the second device in the same way or in a different way compared to other heat sinks in the plurality of heat sinks. For example, each of the plurality of heat sinks may be thermally coupled to the second device and a plurality of buffer materials may be positioned intermediate each heat sink and second device. The same or different buffer materials may be used for each of the plurality of heat sinks. Combinations of any of the various types of heat sinks is also possible.

Substrate Materials

Any of the substrates described herein may comprise one or more layers of one or more nonwoven materials, one or more films, combinations of different nonwoven materials, combinations of different films, combinations of one or more films and one or more nonwoven materials, or combinations of one or more different materials, for example, depending on the specific purpose for which they are intended. The substrates may comprise spunbond, meltblown, or carded materials. The substrates may also comprise polyethylene films. The nonwoven substrates may or may not be hydroentangled.

Some substrates for nonwoven materials may comprise PE/PP bicomponent fiber spunbond substrates. Other suitable substrates may comprise spunbond substrates comprising side-by-side crimped fibers (e.g., PE/PP or PP/PP) that are bonded via calendar (thermal point) bonding or through-air bonding. Other suitable substrates may comprise carded, through-air bonded or resin bonded (highloft) nonwovens comprising PE/PP or PE/PET fibers. The substrates may comprise microfibers and/or nanofibers, optionally with other fibers. In some circumstances, multiple layer substrates may be desired over a single layer substrates (even at the same basis weight) due to increased uniformity/opacity and the ability to combine substrates having different properties. The layers may have the same or different surface energy.

Fibers of the substrates may comprise any suitable thermoplastic polymers. Example thermoplastic polymers are polymers that melt and then, upon cooling, crystallize or harden, but that may be re-melted upon further heating. Suitable thermoplastic polymers may have a melting temperature (also referred to as solidification temperature) from about 60° C. to about 300° C., from about 80° C. to about 250° C., or from about 100° C. to about 215° C., specifically reciting all 0.5° C. increments within the specified ranges and all ranges formed therein or thereby. And the molecular weight of the thermoplastic polymer may be sufficiently high to enable entanglement between polymer molecules and yet low enough to be melt spinnable.

The thermoplastic polymers may be derived from any suitable material including renewable resources (including bio-based and recycled materials), fossil minerals and oils, and/or biodegradable materials. Some suitable examples of thermoplastic polymers include polyolefins, polyesters, polyamides, copolymers thereof, and combinations thereof. Some example polyolefins include polyethylene or copolymers thereof, including low density, high density, linear low density, or ultra-low density polyethylenes.

The thermoplastic polymer component may be a single polymer species or a blend of two or more thermoplastic polymers e.g., two different polypropylene resins. As an example, fibers of a first nonwoven layer of a substrate may comprise polymers such as polypropylene and blends of polypropylene and polyethylene, while a second nonwoven layer of the substrate may comprise fibers selected from polypropylene, polypropylene/polyethylene blends, and polyethylene/polyethylene terephthalate blends. In some forms, the second nonwoven layer may comprise fibers selected from cellulose rayon, cotton, other hydrophilic fiber materials, or combinations thereof.

The fibers of the layer of the substrate may comprise monocomponent fibers, bi-component fibers, and/or bi-constituent fibers, round fibers, or non-round fibers (e.g., capillary channel fibers), and may have major cross-sectional dimensions (e.g., diameter for round fibers) ranging from about 0.1 microns to about 500 microns. The fibers may also be a mixture of different fiber types, differing in such features as chemistry (e.g., polyethylene and polypropylene), components (mono- and bi-), denier (micro denier and >2 denier), shape (i.e. capillary and round) and the like. The fibers may range from about 0.1 denier to about 100 denier.

Example substrates are contemplated where a first plurality of fibers and/or a second plurality of fibers comprise additives in addition to their constituent chemistry. For example, suitable additives include additives for coloration, antistatic properties, lubrication, softness, hydrophilicity, hydrophobicity, and the like, and combinations thereof.

As used herein, the term "monocomponent fiber(s)" refers to a fiber formed from one extruder using one or more polymers. This is not meant to exclude fibers formed from one polymer to which small amounts of additives have been added for coloration, antistatic properties, lubrication, hydrophilicity, etc.

As used herein, the term "bi-component fiber(s)" refers to fibers which have been formed from at least two different polymers extruded from separate extruders but spun together to form one fiber. Bi-component fibers are also sometimes referred to as conjugate fibers or multicomponent fibers. The polymers are arranged in substantially constantly positioned distinct zones across the cross-section of the bi-component fibers and extend continuously along the length of the bi-component fibers. The configuration of such a bi-component fiber may be, for example, a sheath/core arrangement where one polymer is surrounded by another or may be a side-by-side arrangement, eccentric arrangements, a pie arrangement, or an "islands-in-the-sea" arrangement. Some specific examples of fibers which may be used in the first nonwoven layer include polyethylene/polypropylene side-by-side bi-component fibers. Another example is a polypropylene/polyethylene bi-component fiber where the polyethylene is configured as a sheath and the polypropylene is configured as a core within the sheath. Still another example is a polypropylene/polypropylene bi-component fiber where two different propylene polymers are configured in a side-by-side configuration. Additionally, forms are contemplated where the fibers of a nonwoven layer are crimped.

Bi-component fibers may comprise two different resins, e.g., a first polypropylene resin and a second polypropylene resin. The resins may have different melt flow rates, molecular weights, or molecular weight distributions.

As used herein, the term "bi-constituent fiber(s)" refers to fibers which have been formed from at least two polymers extruded from the same extruder as a blend. Bi-constituent fibers do not have the various polymer components arranged in relatively constantly positioned distinct zones across the cross-sectional area of the fiber and the various polymers are usually not continuous along the entire length of the fiber, instead usually forming fibrils which start and end at random. Bi-constituent fibers are sometimes also referred to as multi-constituent fibers. In other examples, a bi-component fiber may comprise multiconstituent components.

As used herein, the term "non-round fiber(s)" describes fibers having a non-round cross-section and includes "shaped fibers" and "capillary channel fibers." Such fibers may be solid or hollow, and they may be tri-lobal, delta-shaped, and may be fibers having capillary channels on their outer surfaces.

Other example nonwoven materials for the substrates may comprise spunlace materials, needle punched materials, wet-laid materials, or air-laid materials, for example.

EXAMPLES/COMBINATIONS

1. An apparatus for altering a substrate for an absorbent article, comprising:
   a first device;
   a second device configured to transmit vibrational energy toward a nip formed between the second device and the first device; and
   a heat sink thermally coupled to the second device and configured to cool the second device while a substrate is conveyed through the nip to be altered by the vibrational energy.
2. The apparatus of paragraph 1, comprising a buffer material positioned intermediate the heat sink and the second device.
3. The apparatus of paragraph 2, wherein the buffer material is conductive.
4. The apparatus of paragraph 2 or 3, wherein the buffer material is a fluid or a paste.
5. The apparatus of any one of paragraphs 2 to 4, wherein the buffer material is a deformable material.
6. The apparatus of any one of paragraphs 1 to 5, wherein the heat sink is in contact with the second device, and wherein the heat sink has a coefficient of friction in the range of about 0.05 to about 4.
7. The apparatus of any one of paragraphs 1 to 6, wherein the second device is a sonotrode, wherein the first device is a rotating anvil, and wherein the vibrational energy is ultrasonic energy.
8. The apparatus of any one of paragraphs 1 to 7, wherein an outer surface of the first device defines a plurality of recesses, and wherein the recesses have a shape configured to produce projections in the substrate that are suitable for use in a touch fastener.
9. The apparatus of any one of paragraphs 1 to 8, wherein an outer surface of the first device comprises bonding nubs to produce bonds in the substrate.
10. The apparatus of any one of paragraphs 1 to 9, wherein the heat sink comprises a material having a thermal conductivity higher than a thermal conductivity than a primary material of the second device.
11. The apparatus of paragraph 10, wherein the material is aluminum or brass.

12. The apparatus of any one of paragraphs 1 to 11, wherein the second device comprises titanium.
13. The apparatus of any one of paragraphs 1 to 12, comprising a second heat sink that is thermally coupled to the second device; and
    optionally a second buffer material positioned intermediate the second heat sink and second device.
14. The apparatus of any one of paragraphs 1 to 13, wherein a cavity is defined in the heat sink to cool the heat sink.
15. The apparatus of any one of paragraphs 1 to 14, wherein a projection extends from the heat sink to cool the heat sink.
16. An apparatus for altering a substrate for an absorbent article, comprising:
    a first device;
    a second device configured to transmit vibrational energy toward a nip formed between the second device and the first device;
    a heat sink thermally coupled to the second device; and
    a buffer material positioned intermediate the heat sink and the second device; wherein the heat sink is configured to cool the second device by transferring thermal energy from the second device through the buffer material to the heat sink while a substrate is conveyed through the nip to be altered by the vibrational energy.
17. The apparatus of paragraph 16, wherein the heat sink does not vibrate with the second device.
18. The apparatus of paragraph 16 or 17, wherein a cavity is defined in the heat sink to cool the heat sink.
19. The apparatus of any one of paragraphs 16 to 18, wherein a projection extends from the heat sink to cool the heat sink.
20. A method of manufacturing portions of absorbent articles comprising:
    conveying a substrate through a nip formed between a first device and a second device;
    transmitting vibrational energy from the second device toward the first device via the nip to alter the substrate;
    providing a heat sink that is thermally coupled to the second device;
    providing a buffer material intermediate the heat sink and the second device; and
    cooling the second device by transferring thermal energy from the second device through the buffer material to the heat sink.
21. The method of paragraph 20, wherein the heat sink does not vibrate with the second device.
22. The method of paragraph 20 or 21, comprising providing a cavity in the heat sink, and conveying a cooling fluid through the cavity to cool the heat sink.
23. The method of any one of paragraphs 20 to 22, comprising providing a projection extending from the heat sink, and conveying a fluid over the projection to cool the heat sink.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests, or discloses any such invention. Further, to the extent that any meaning or definition of a term in this document conflicts with any meaning or definition of the same term in a document incorporated by reference, the meaning or definition assigned to that term in this document shall govern.

While particular embodiments of the present disclosure have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of manufacturing portions of absorbent articles comprising:

conveying a substrate through a nip formed between a first device and a second device;

transmitting vibrational energy from the second device toward the first device via the nip to alter the substrate; and contact cooling the second device, during the transmitting vibrational energy step, by transferring thermal energy from the second device to a heat sink that is substantially isolated from the vibrational energy;

wherein the heat sink is in contact with the second device, and wherein the heat sink has a coefficient of friction in the range of about 0.05 to about 0.4.

2. The method of claim 1, wherein the heat sink is thermally coupled to the second device.

3. The method of claim 1, wherein the second device is a sonotrode, and wherein the vibrational energy is ultrasonic energy.

4. The method of claim 1, wherein the step of transmitting vibrational energy from the second device toward the first device via the nip to alter the substrate is intermittent.

5. The method of claim 1, wherein the second device comprises titanium.

6. The method of claim 1, comprising conveying a fluid over a portion of the heat sink to cool the heat sink.

7. The method of claim 1, comprising providing a cavity in the heat sink, and conveying a cooling fluid through the cavity to cool the heat sink.

8. The method of claim 1, comprising providing a projection extending from the heat sink, and conveying a fluid over the projection to cool the heat sink.

9. The method of claim 1, comprising providing a plurality of recesses in an outer surface of the first device, wherein each of the plurality of recesses has a shape configured to produce a projection in the substrate suitable for use in a touch fastener.

10. The method of claim 9, wherein the step of transmitting vibrational energy from the second device toward the first device via the nip to alter the substrate comprises locally softening a portion of the substrate to force a portion of softened material into at least some of the recesses to form projections suitable for use in a touch fastener.

11. The method of claim 1, comprising conveying a second substrate through the nip.

12. The method of claim 11, wherein the step of transmitting vibrational energy from the second device toward the first device via the nip to alter the substrate comprises bonding the substrate to the second substrate.

13. The method of claim 1, wherein the heat sink material comprises a material having a thermal conductivity higher than a thermal conductivity of a primary material of the second device.

14. The method of claim 13, wherein the material is aluminum or brass.

* * * * *